(12) United States Patent
Park et al.

(10) Patent No.: US 11,906,809 B2
(45) Date of Patent: *Feb. 20, 2024

(54) VOICE COIL MOTOR

(71) Applicant: LG INNOTEK CO., LTD., Seoul (KR)

(72) Inventors: Sang Ok Park, Seoul (KR); Hyun Rae Cho, Seoul (KR); Seong Min Lee, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,805

(22) Filed: May 24, 2022

(65) Prior Publication Data

US 2022/0283400 A1 Sep. 8, 2022

Related U.S. Application Data

(63) Continuation of application No. 17/021,832, filed on Sep. 15, 2020, now Pat. No. 11,372,194, which is a
(Continued)

(30) Foreign Application Priority Data

| May 9, 2012 | (KR) | 10-2012-0049186 |
| Aug. 21, 2012 | (KR) | 10-2012-0091168 |
| Aug. 21, 2012 | (KR) | 10-2012-0091169 |

(51) Int. Cl.
*H04N 23/68* (2023.01)
*G02B 7/02* (2021.01)
(Continued)

(52) U.S. Cl.
CPC ............... *G02B 7/08* (2013.01); *G02B 7/005* (2013.01); *G02B 7/023* (2013.01); *G02B 7/09* (2013.01);
(Continued)

(58) Field of Classification Search
CPC ...................................... G03B 13/36
See application file for complete search history.

(56) References Cited

U.S. PATENT DOCUMENTS 7,649,703 B2   1/2010 Shiraki et al.
10,816,751 B2 * 10/2020 Park ......... H02P 7/025
(Continued)

FOREIGN PATENT DOCUMENTS

CN  1910492 A   2/2007
CN  101124711 A  2/2008
(Continued)

OTHER PUBLICATIONS

International Search Report in International Application No. PCT/KR2013/002902, filed Apr. 8, 2013.
(Continued)

*Primary Examiner* — Noam Reisner
(74) *Attorney, Agent, or Firm* — Saliwanchik, Lloyd & Eisenschenk

(57) ABSTRACT

An exemplary embodiment of the present invention a rotor including a lens and formed with a first driving unit, a stator formed with a second driving unit driving the rotor in response to electromagnetic interaction with the first driving unit, and a base on which the stator is fixed, wherein the rotor is brought into contact with the base, in a case the lens is in a UP posture, and the rotor is distanced from the base, in a case the lens is in a DOWN posture.

20 Claims, 18 Drawing Sheets

Related U.S. Application Data continuation of application No. 16/238,947, filed on Jan. 3, 2019, now Pat. No. 10,816,751, which is a continuation of application No. 15/142,951, filed on Apr. 29, 2016, now Pat. No. 10,222,579, which is a continuation of application No. 14/398,359, filed as application No. PCT/KR2013/002902 on Apr. 8, 2013, now Pat. No. 9,341,810.

(51) Int. Cl.
  G02B 7/09 (2021.01)
  H02P 7/025 (2016.01)
  G02B 7/08 (2021.01)
  H02K 41/035 (2006.01)
  G02B 7/00 (2021.01)

(52) U.S. Cl.
  CPC ..... *H02K 41/0354* (2013.01); *H02K 41/0356* (2013.01); *H02P 7/025* (2016.02); *H04N 23/685* (2023.01)

(56) References Cited

U.S. PATENT DOCUMENTS

| | | | |
|---|---|---|---|
| 11,372,194 B2* | 6/2022 | Park | H02K 41/0356 |
| 2003/0076421 A1 | 4/2003 | Dutta | |
| 2005/0207743 A1 | 9/2005 | Uehara | |
| 2006/0165395 A1 | 7/2006 | Shimano et al. | |
| 2006/0181632 A1 | 8/2006 | Makii et al. | |
| 2007/0086770 A1 | 4/2007 | Okita et al. | |
| 2007/0110424 A1 | 5/2007 | Iijima et al. | |
| 2007/0166022 A1 | 7/2007 | Lai | |
| 2008/0031609 A1 | 2/2008 | Rukes | |
| 2008/0192124 A1* | 8/2008 | Nagasaki | G02B 7/08 348/E5.04 |
| 2008/0285162 A1 | 11/2008 | Fujita et al. | |
| 2008/0297922 A1 | 12/2008 | Lule | |
| 2009/0086344 A1 | 4/2009 | Furuya et al. | |
| 2009/0278978 A1 | 11/2009 | Suzuki | |
| 2010/0007973 A1 | 1/2010 | Sata et al. | |
| 2010/0061000 A1 | 3/2010 | Higuchi | |
| 2010/0232042 A1 | 9/2010 | Terajima | |
| 2010/0246035 A1 | 9/2010 | Yamashita et al. | |
| 2011/0116180 A1 | 5/2011 | Lim | |
| 2011/0252782 A1 | 10/2011 | Nobe | |
| 2011/0286099 A1 | 11/2011 | Shiraki et al. | |
| 2012/0008220 A1 | 1/2012 | Lee et al. | |
| 2012/0008221 A1 | 1/2012 | Min et al. | |
| 2012/0026611 A1 | 2/2012 | Hu et al. | |
| 2012/0154614 A1* | 6/2012 | Moriya | H04N 23/54 348/208.5 |
| 2012/0200176 A1 | 8/2012 | Park | |

FOREIGN PATENT DOCUMENTS

| | | |
|---|---|---|
| CN | 101246248 A | 8/2008 |
| CN | 201107449 Y | 8/2008 |
| CN | 101398524 A | 4/2009 |
| CN | 101483376 A | 7/2009 |
| CN | 101577790 A | 11/2009 |
| CN | 101750691 A | 6/2010 |
| CN | 101807841 A | 8/2010 |
| CN | 201689206 U | 12/2010 |
| CN | 102027408 A | 4/2011 |
| CN | 102033387 A | 4/2011 |
| CN | 102244451 A | 11/2011 |
| CN | 102289049 A | 12/2011 |
| CN | 102315748 A | 1/2012 |
| CN | 102332805 A | 1/2012 |
| CN | 102478698 A | 5/2012 |
| CN | 102629815 A | 8/2012 |
| CN | 102684444 A | 9/2012 |
| CN | 102916552 A | 2/2013 |
| CN | 103036388 A | 4/2013 |
| EP | 1 876 691 A1 | 1/2008 |
| EP | 2267524 A2 | 12/2010 |
| JP | 2005-173431 A | 6/2005 |
| JP | 2007-047683 A | 2/2007 |
| JP | 2007-171764 A | 7/2007 |
| KR | 10-2008-0054839 A | 6/2008 |
| KR | 10-2009-0026480 A | 3/2009 |
| KR | 10-2009-0109759 A | 10/2009 |
| KR | 10-2011-0013966 A | 2/2011 |
| KR | 10-2012-0006361 A | 1/2012 |
| KR | 10-2012-0008701 A | 2/2012 |
| KR | 10-2012-0009360 A | 2/2012 |
| KR | 10-2012-0017304 A | 2/2012 |
| KR | 10-2012-0053837 A | 5/2012 |
| KR | 10-2012-0066264 A | 6/2012 |
| KR | 10-2012-0090379 A | 8/2012 |
| KR | 10-2013-0055288 A | 5/2013 |
| WO | 2008/096455 A1 | 8/2008 |

OTHER PUBLICATIONS

Office Action dated Feb. 25, 2015 in U.S. Appl. No. 14/398,359.
Office Action dated May 31, 2016 in Chinese Application No. 201380024506.X.
European Search Report dated Jun. 1, 2016 in European Application No. 13787976.3.
European Search Report dated Aug. 28, 2018 in European Application No. 18168696.5.
Office Action dated Sep. 14, 2018 in Korean Application No. 10-2012-0091168.
Office Action dated Sep. 14, 2018 in Korean Application No. 10-2012-0091169.
Office Action dated Nov. 26, 2018 in Korean Application No. 10-2012-0049186, filed May 9, 2012.
Office Action dated Sep. 23, 2019 in Korean Application No. 10-2012-0049186.
Office Action dated Jan. 2, 2020 in Korean Application No. 10-2019-0142891.
Office Action dated Sep. 24, 2019 in Chinese Application No. 201710827822.0.
Office Action dated Oct. 2, 2019 in U.S. Appl. No. 16/238,947.
Notice of Allowance dated Jun. 15, 2020 in U.S. Appl. No. 16/238,947.
Office Action dated Aug. 18, 2020 in Chinese Application No. 201710827822.0.
Office Action dated Aug. 10, 2020 in Korean Application No. 10-2020-0096880.
European Search Report dated Sep. 30, 2020 in European Application No. 20174837.3.
Office Action dated Nov. 9, 2021 in Korean Application No. 10-2021-0128407.
Office Action dated Oct. 27, 2021 in U.S. Appl. No. 17/021,832.
Notice of Allowance dated Feb. 25, 2022 in U.S. Appl. No. 17/021,832.
European Search Report dated Sep. 25, 2023 in European Application No. 23178622.9.

* cited by examiner

VOICE COIL MOTOR

CROSS-REFERENCE TO RELATED APPLICATIONS

This application is a continuation of U.S. application Ser. No. 17/021,832, filed Sep. 15, 2020; which is a continuation of U.S. application Ser. No. 16/238,947, filed Jan. 3, 2019, now U.S. Pat. No. 10,816,751, issued Oct. 27, 2020; which is a continuation of U.S. application Ser. No. 15/142,951, filed Apr. 29, 2016, now U.S. Pat. No. 10,222,579, issued Mar. 5, 2019; which is a continuation of U.S. application Ser. No. 14/398,359, filed Oct. 31, 2014, now U.S. Pat. No. 9,341,810, issued May 17, 2016; which is the U.S. national stage application of International Patent Application No. PCT/KR2013/002902, filed Apr. 8, 2013; which claims priority to Korean Patent Application Nos. 10-2012-0049186, filed May 9, 2012; 10-2012-0091168, filed Aug. 21, 2012; and 10-2012-0091169, filed Aug. 21, 2012; which are hereby incorporated by reference in their entirety.

TECHNICAL FIELD

The teachings in accordance with exemplary and non-limiting embodiments of this disclosure relate generally to a voice coil motor.

BACKGROUND ART

Recently, a mobile phone or a smart phone mounted with a camera module capable of storing an object in a digital still image or a video image has been developed. A conventional camera module includes a lens and an image sensor module configured to convert light having passed the lens to a digital image.

However, the conventional camera module suffers from disadvantages for lack of an auto focus function automatically adjusting a gap between a lens and an image sensor module, resulting in difficulty in obtaining a high quality digital image and resultantly leading to an image quality degradation caused by handshake generated by user handshake.

DISCLOSURE

Technical Problem

The present disclosure is to provide a VCM (Voice Coil Motor) configured to simultaneously perform focusing operation and handshake compensation functions while a lens horizontally moves relative to an image sensor. The present disclosure is also to provide a VCM configured to reduce a consumption current by variably changing a posture of a rotor in response to a lens posture.

TECHNICAL SOLUTION

In one exemplary embodiment of the present disclosure, there is provided a camera module, the camera module comprising:
- a rotor including a lens and formed with a first driving unit;
- a stator formed with a second driving unit driving the rotor in response to electromagnetic interaction with the first driving unit; and a base on which the stator is fixed, wherein the rotor is brought into contact with the base, in a case the lens is in a UP posture, and the rotor is distanced from the base, in a case the lens is in a DOWN posture.

In another exemplary embodiment of the present disclosure, there is provided a VCM (Voice Coil Motor), the VCM comprising:
- a rotor including a first driving unit arranged at a periphery of a bobbin fixing a lens;
- a stator including a second driving unit opposite to the first driving unit and a housing fixing the second driving unit;
- an elastic member coupled at one side to the rotor and coupled at the other side to the stator;
- a base supporting the stator and having an opening exposing the lens; and
- a case covering the housing and being coupled to the base, wherein an interference prevention unit is formed at any one of the case and the housing to inhibit a part of the elastic member from interfering with the case or the housing, in a case the rotor ascends or descends relative to the stator.

ADVANTAGEOUS EFFECTS

An exemplary embodiment of the present invention has an advantageous effect in that current consumption can be reduced and a camera module can be driven under an optimum condition by detecting a posture of a VCM or a lens and controlling the VCM using a posture data.

Another advantageous effect is that an actuator is removed of mechanical offset to reduce current consumption, to enhance a design freedom of electromagnetic force, to solve a defocusing problem by applying a current to an opposite direction even if there is generated a change in spring, and to improve a yield of a camera module by dispensing with an initial focusing.

Still another advantageous effect is that a VCM is inhibited from generating a driving fault during a focusing operation by maintaining a rotor to be in a state of being distanced from a base in a case no driving signal is applied, driving the rotor to both directions of facing a base or distancing from the base through application of the driving signal, and by inhibiting an elastic member coupled to the rotor from interfering with a case covering the rotor, in a case the rotor is particularly driven to both directions.

DETAILED DESCRIPTION

First Exemplary Embodiment

Figure 1:
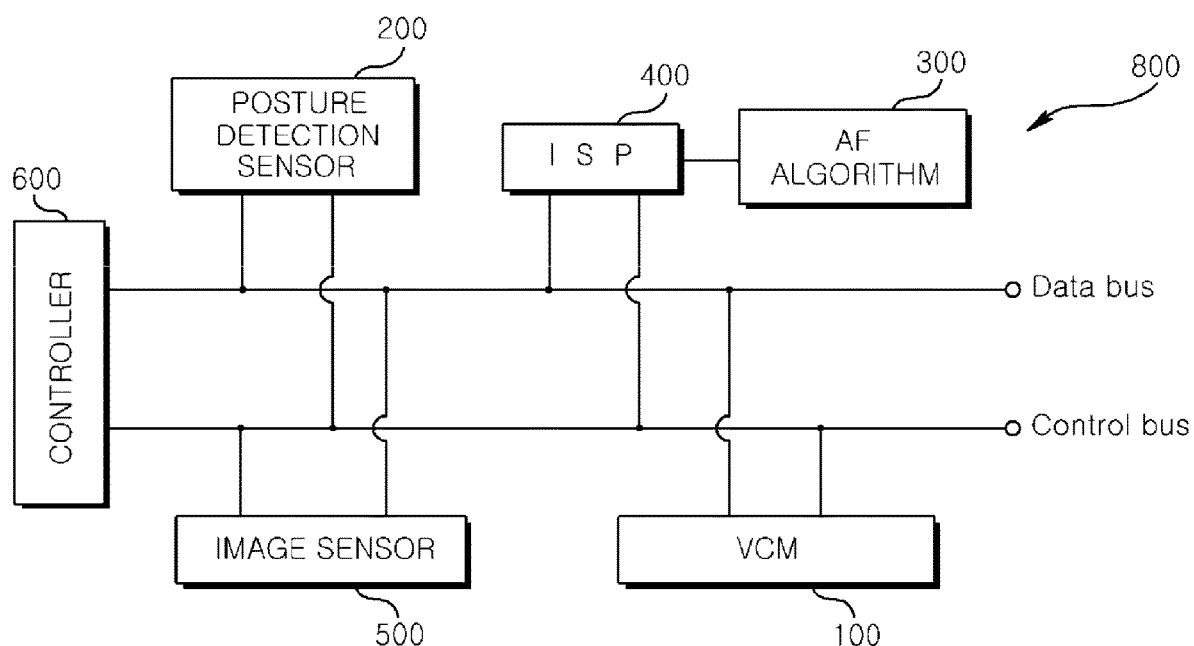
FIG. 1 is a block diagram illustrating a camera module including a VCM according to an exemplary embodiment of the present invention.

FIG. 1 is a block diagram illustrating a camera module including a VCM according to an exemplary embodiment of the present invention.

Referring to FIG. 1, the camera module according to the exemplary embodiment of the present invention includes a VCM (Voice Coil Motor, 100), a posture detection sensor (200), an auto focus algorithm (300), an ISP (Image Signal Processor. 400), an image sensor (500) and a controller (600), where the VCM (100) includes a rotor including a lens, and performs an auto focusing operation of the VCM (100) of the camera module in response to an electromagnetic force.

Furthermore, the posture detection sensor (200) outputs a posture data by determining a posture of the VCM (100) or a lens, and the ISP (400) generates a driving signal for driving the VCM using an optimum focus value of the lens calculated by the auto focus algorithm (300), wherein the optimum focus value is generated by a posture data corresponding to a posture of the VCM outputted from the posture detection sensor (200).

At this time, the posture detection sensor (200) may include a gyro sensor detecting a direction of gravity. The auto focus algorithm (300) outputs a detection signal by detecting an optimum focus value of the VCM based on a distance from an object in order to accurately realize the auto focusing and to realize a fast auto focusing response time. The auto focus algorithm (300) may be used in the form of an algorithm inside the image signal processor (400), or may be used by being embedded in a chip separate from the image sensor processor (400).

Hence, the posture detection sensor (200) senses three kinds of postures of the VCM or the lens, as described later, where, although the posture detection sensor (200) can sense three or more kinds of postures of the VCM (100) or the lens, an exemplary embodiment of the present disclosure describes that the posture detection sensor (200) senses three kinds of postures of the VCM (100) or the lens including UP, SIDE and DOWN postures, for explanation convenience.

Furthermore, the image sensor (500) converts light having passed the lens to a digital signal, and the controller (600) controls the VCM (100), the posture detection sensor (200), the image signal processor (400) and the image sensor (500). The controller (600) is connected to the VCM (100), the posture detection sensor (200), the image signal processor (400) and the image sensor (500) via a data bus and/or a control bus.

Thus, an exemplary embodiment of the present disclosure is advantageous in that a posture of the VCM or a lens is detected, the VCM is controlled using the posture of the VCM or the lens to reduce current consumption, and the VCM (100) of the camera module is driven on an optimum base.

Figure 2:
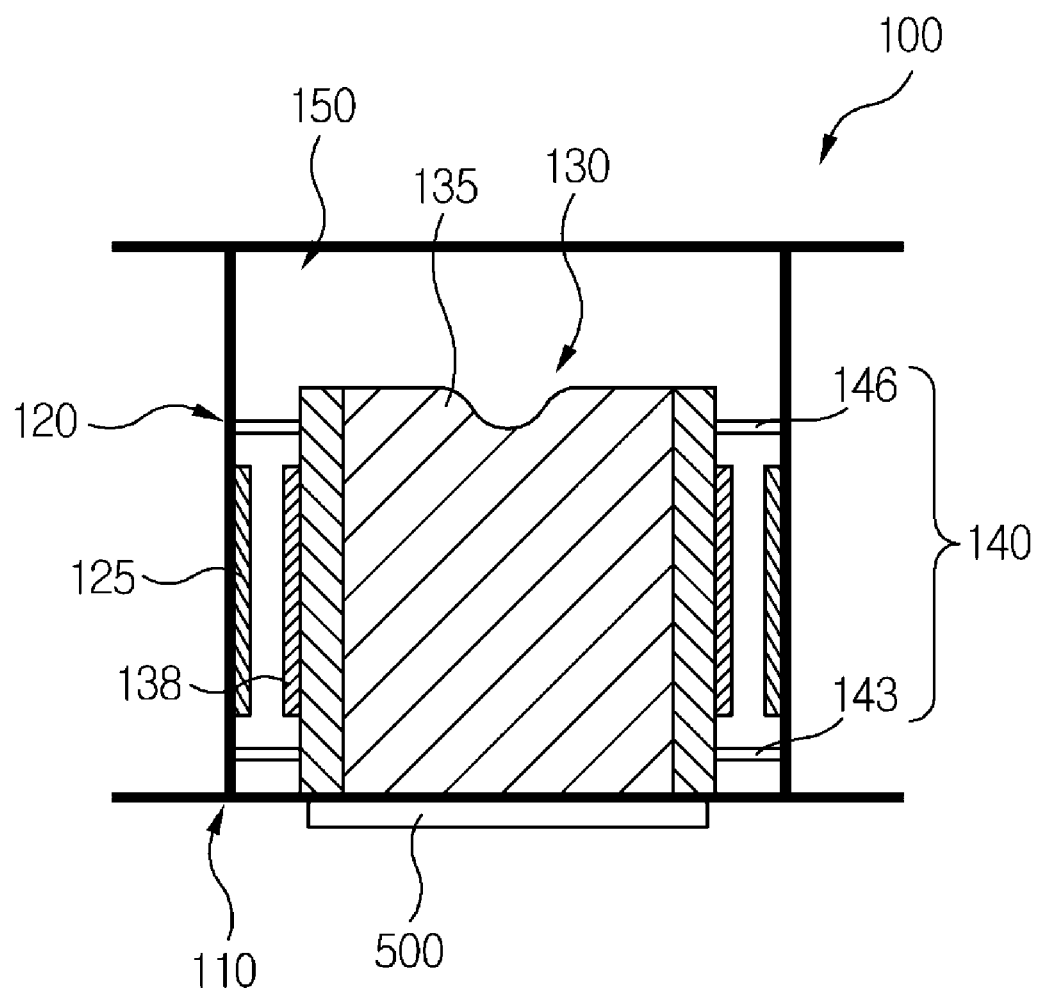
FIG. 2 is a conceptual cross-sectional view illustrating an UP posture of a lens of a VCM according to an exemplary embodiment of the present invention.
Figure 3:
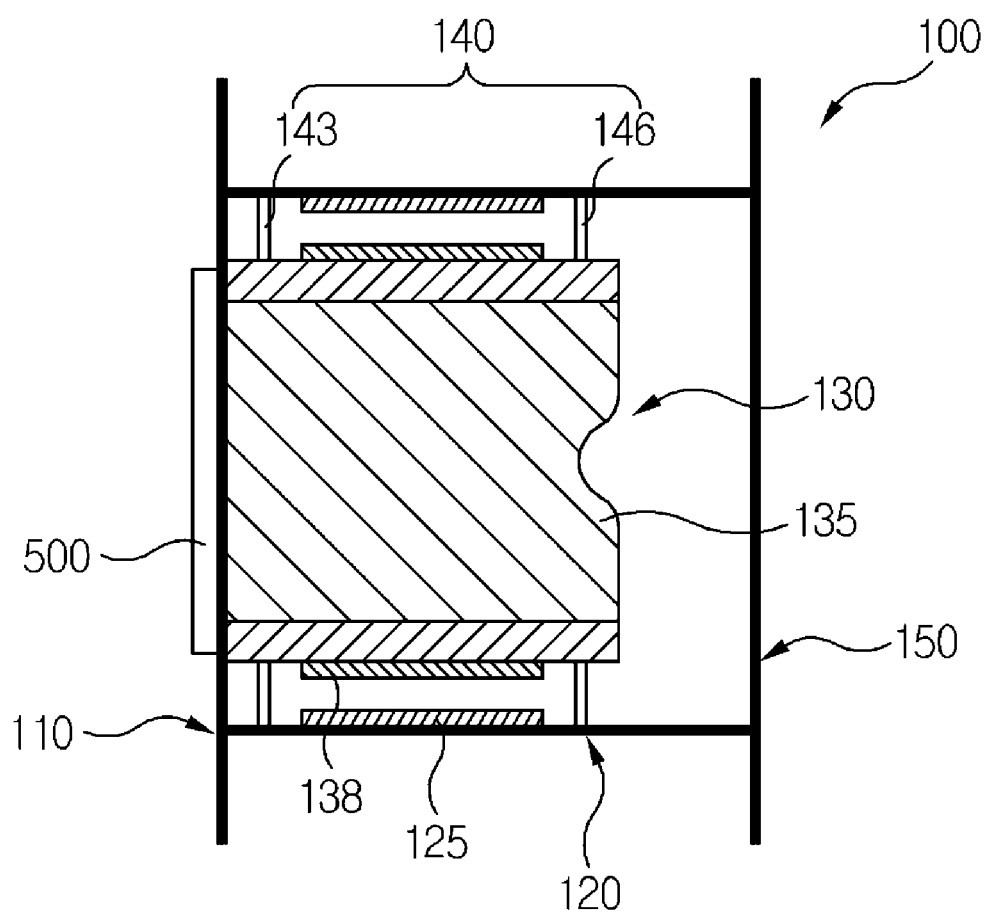
FIG. 3 is a conceptual cross-sectional view illustrating a SIDE posture of a lens of a VCM according to an exemplary embodiment of the present invention.
Figure 4:
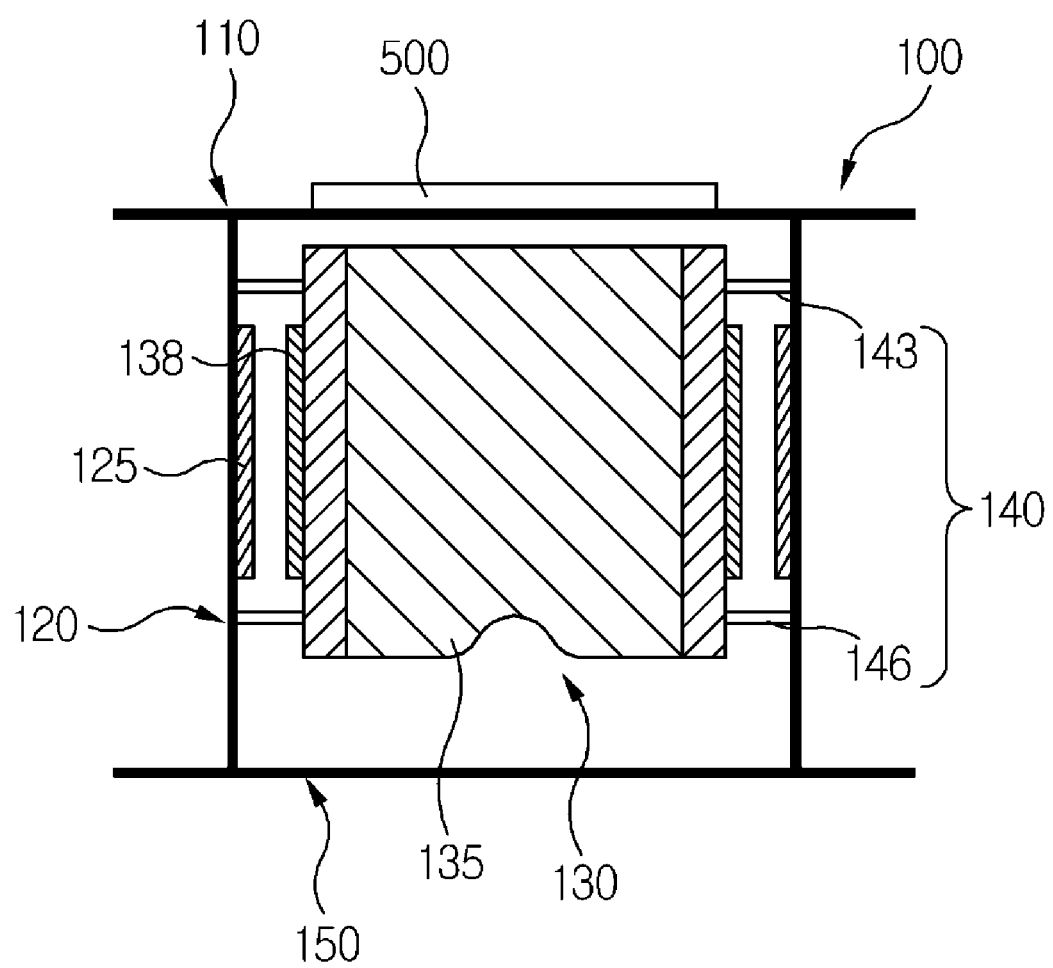
FIG. 4 is a conceptual cross-sectional view illustrating a DOWN posture of a lens of a VCM according to an exemplary embodiment of the present invention.

FIG. 2 is a conceptual cross-sectional view illustrating an UP posture of a lens of a VCM according to an exemplary embodiment of the present invention, FIG. 3 is a conceptual cross-sectional view illustrating a SIDE posture of a lens of a VCM according to an exemplary embodiment of the present invention, and FIG. 4 is a conceptual cross-sectional view illustrating a DOWN posture of a lens of a VCM according to an exemplary embodiment of the present invention.

FIG. 2 is a conceptual cross-sectional view illustrating an UP posture of a lens of a VCM at the camera module according to an exemplary embodiment of the present invention, where the "UP posture" may be defined in such a manner that an optical axis of a lens (135) of a rotor (130) at a VCM is formed to a direction vertical to a ground, and a base (110) is in a position facing the ground.

FIG. 3 is a conceptual cross-sectional view illustrating a SIDE posture of a lens of a VCM according to an exemplary embodiment of the present invention, where the "SIDE posture" may be defined in such a manner that an optical axis of a lens (135) of a rotor (130) at a VCM is formed to a direction parallel with a ground, and a base (110) is in a position perpendicular to the ground.

FIG. 4 is a conceptual cross-sectional view illustrating a DOWN posture of a lens of a VCM according to an exemplary embodiment of the present invention, where the "DOWN posture" may be defined in such a manner that an optical axis of a lens (135) of a rotor (130) of a VCM (100) is formed to a direction perpendicular to a ground, and a cover (150) is in a position facing the ground.

At this time, the VCM according to an exemplary embodiment of the present invention includes a lens (135), a rotor (130) formed with a first driving unit (138), a stator (120) formed with a second driving unit driving the rotor (130) in response to electromagnetic interaction with the first driving unit (138), and a base (110) on which the stator (120) is fixed, where the rotor (130) is brought into contact with the base (110), in a case the lens (135) is in an UP posture, and the rotor (130) is distanced from the base (110), in a case the lens (135) is in a DOWN posture.

Furthermore, some offsets may exist, in a case the lens (135) is in an UP posture or in a SIDE posture, and the offset may cease to exist because of droop caused by self-weight of the rotor (135) to a gravitational direction, in a case the lens (135) is in a DOWN posture. At this time, the rotor (130), the stator (120) and the base (110) may be parts of the VCM (100).

Referring to FIG. 2, the VCM (100) performs the auto focus function by driving the lens (135). By way of example, the lens (135) mounted on the VCM (100) is moved to a direction ascending from the base (110), during which time the auto focus operation is performed between the lens (135) and the image sensor (300).

The VCM (100) may include a base (110), a stator (120), a rotor (130), an elastic member (140) and a cover (150). Furthermore, the base (110) takes a shape of a plate centrally formed with an opening for passing light, and serves as a lower stopper of the rotor (130). The base (110) may be formed at a rear surface or a direction to the rear surface with the image sensor (500), where the image sensor (500) converts the light focused by the light of the rotor (130) to a digital image or a video image.

Furthermore, the stator (120) is fixed on the base (110). At this time, the first driving unit (138) may be a magnet and the second driving unit (125) may be a wound coil. Alternatively, the first driving unit (138) may be a wound coil and the second driving unit (125) may be a magnet.

Furthermore, the stator (120) may be formed therein with an accommodation space in which the rotor (130) may be positioned. In addition, the elastic member (140) may be fixed at one side to the rotor (130), and fixed at the other side opposite to the one side to the stator (120), where the elastic member (140) may elastically support the rotor (130).

In the exemplary embodiment of the present disclosure, the elastic member (140) may include a first elastic member (143) formed at a bottom peripheral surface of the rotor (130) and a second elastic member (146) formed at an upper peripheral surface of the rotor (130). In a case the lens of FIG. 2 is at an UP posture facing an upper side direction, the elastic member (140) contacts the rotor (130), in a case no electromagnetic force is applied to the second driving unit of the stator (120) and the first driving unit (138) of the rotor (130). That is, the elastic member (140) is such that the rotor (130) contacts the upper surface of the base (110) by the weight of the rotor (130), in a case no electromagnetic force is applied to the second driving unit of the stator (120) and the first driving unit (138) of the rotor (130).

At this time, the VCM (100) recognizes that an approximately 0.03 mm of offset exists between the rotor (130) and the upper surface of the base (110). Hence, while the lens of FIG. 2 is an UP posture positioned at an upper side, the VCM (100) according to an exemplary embodiment of the present disclosure needs a greater electromagnetic force than the elasticity of the elastic member (140) and the self-weight of the rotor (130) in order to lift the rotor (130) from the base (100). In addition, the cover (150) is fixed to the base (110) to wrap the stator (120) and the rotor (130). The cover (150) functions as an upper stopper to stop the rotor (130).

Meanwhile, the present disclosure may be so configured as to allow the rotor (130) to contact the base (110) while the lens (135) is at the UP posture, and the rotor (130) to be distanced from the base (110) while the lens (135) is at a SIDE posture or a DOWN posture.

Furthermore, the VCM (100) may be applicable by an actuator driving a lens, an actuator driven by piezoelectric power, or a MEMS (Micro Electro Mechanical System) actuator driven by electrostatic capacity method. That is, an actuator driving a lens of a camera module may be one of a VCM actuator, an actuator driven by piezoelectric power, and a MEMS (Micro Electro Mechanical System) actuator driven by electrostatic capacity method.

At this time, the VCM (100) may include an actuator (130) including a lens (135) and an actuator driving the rotor (130). In a case the lens (135) is at an UP posture or a SIDE posture, the actuator (130) may be brought into contact with the base (110) functioning as a stopper of the rotor (130), in a case the lens (135) is at a DOWN posture, the actuator (130) may be distanced from the base (110), or in a case the lens (135) is at an UP posture, the actuator (130) may be brought into contact with the base (110), or in a case the lens (135) is at a SIDE posture or at a DOWN posture, the actuator (130) may be distanced from the base (110).

Thus, the present disclosure is advantageous in that the actuator is removed of mechanical offset to reduce current consumption, a design freedom of electromagnetic force is enhanced to solve a defocus problem even if a current is applied to a reverse direction due to change in spring, and an initial focusing is dispensed with to improve a yield of VCM of a camera module.

Figure 5:
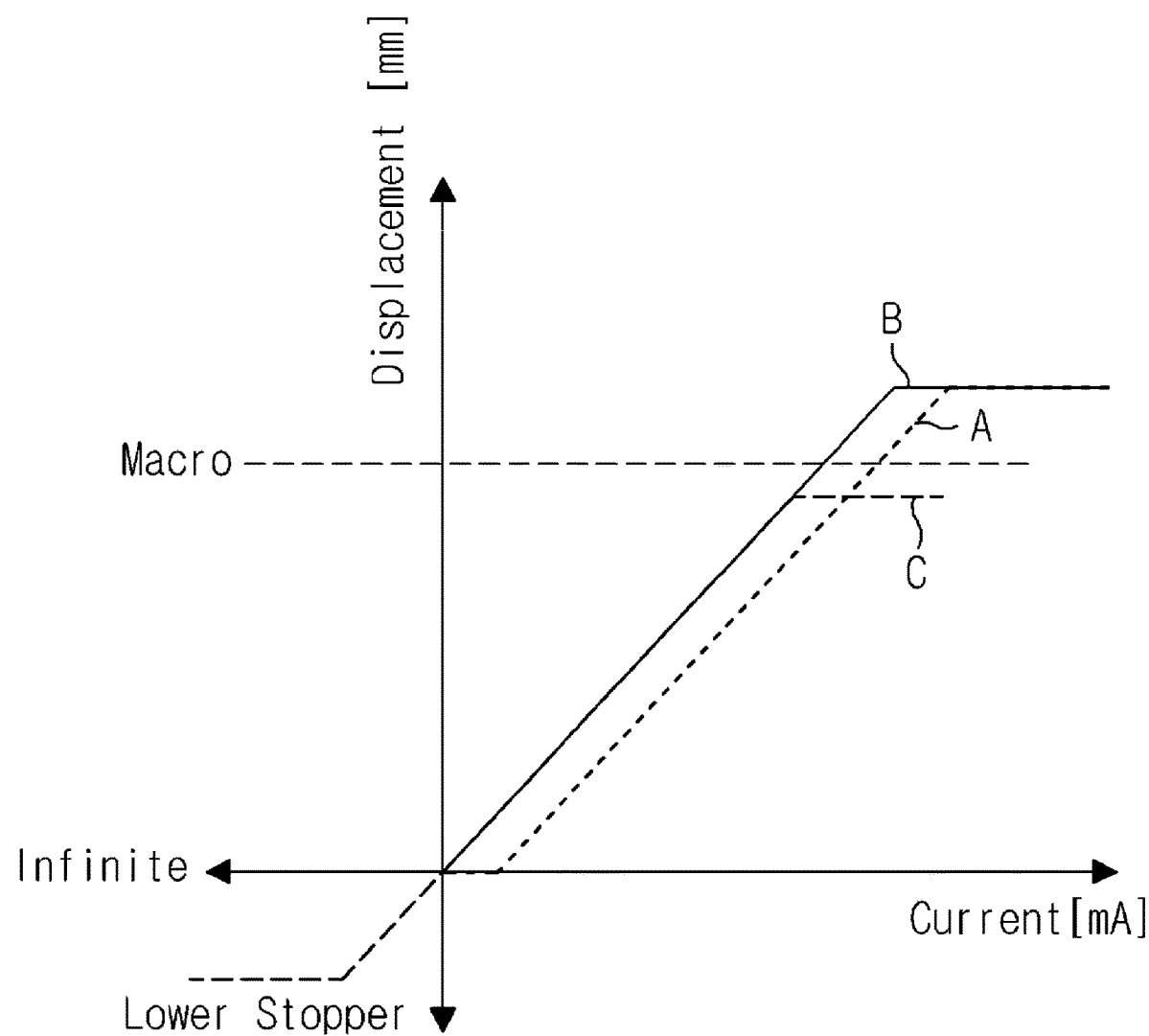
FIG. 5 is a graph illustrating a current-distance characteristic based on a posture of a VCM according to an exemplary embodiment of the present invention.

FIG. 5 is a graph illustrating a current-distance characteristic based on a posture of a VCM according to an exemplary embodiment of the present invention.

Referring to FIG. 5, the rotor must be in contact with the base at the UP posture of the VCM of the camera module, and the driving unit may be applied with a current greater than a reference level, because an electromagnetic force greater than the elasticity of the elastic member and the self-weight of the rotor is required to lift or float the rotor from the base.

Hence, the UP posture of the VCM of the camera module in FIG. 5 can have 'A' auto focus search section. Thus, the rotor is not driven by a current less than a reference current [mA] in FIG. 5, and therefore a current section with a current less than the reference current [mA] may be defined as a non-driving section where the rotor is not operated, and no auto focus operation is realized at the non-driving section where the rotor is not operated.

Furthermore, the rotor is driven by a current greater than the reference current [mA] where the electromagnetic force driving the rotor becomes greater than the elasticity of the elastic member and the self-weight of the rotor. At this time, a current section with a current greater than the reference current [mA] may be defined as a section where the rotor is driven, where the rotor is operated, and the auto focus operation is realized at last at a driving section where the rotor is operated.

Furthermore, although the rotor is in contact with the base at the SIDE posture of the VCM of the camera module, the rotor is not driven but starts to be driven at the moment a current is applied to the rotor, because the elasticity of the elastic member and the self-weight of the rotor was not considered for lifting or floating the rotor from the base. Hence, the SIDE posture of the VCM of the camera module can have 'B' auto focus search section of FIG. 5. At this time, the VCM arranged at the SIDE posture can be driven by a current less than a current at the VCM at the UP posture. That is, a start current for driving the rotor at the SIDE posture is smaller than that for driving the rotor at the UP posture.

At this time, a start current at the SIDE posture of the VCM of the camera module may be in the range of 0 mA~10 mA, and a posture difference between the UP posture and the SIDE posture may be approximately 30~50 μm. At the same time, the rotor is distanced from the base in a case the VCM of the camera module is at the DOWN posture, and has a 'C' auto focus search section in FIG. 5, whereby the rotor may be reversely driven at the DOWN posture of the VCM of the camera module.

Second Exemplary Embodiment

Now, a second exemplary embodiment of the present disclosure will be described, where different reference numerals will be provided to the same configuration as that of the first exemplary embodiment of the present disclosure in order to distinguish the second exemplary embodiment from the first exemplary embodiment.

Figure 6:
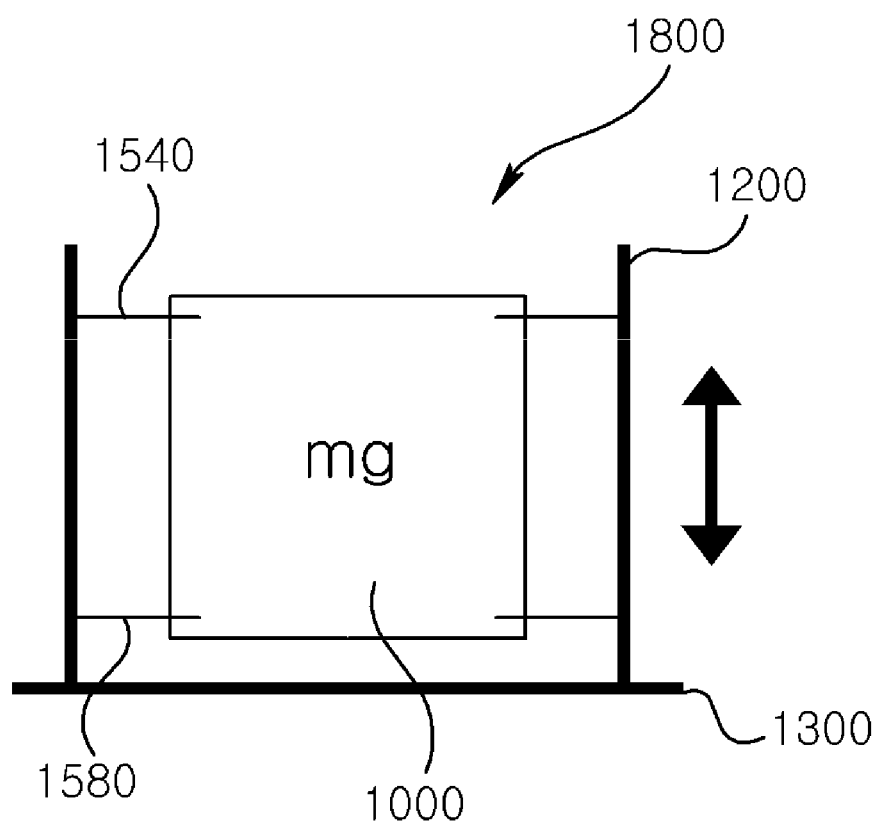
FIG. 6 is conceptual diagram illustrating a VCM according to an exemplary embodiment of the present invention.

FIG. 6 is conceptual diagram illustrating a VCM according to an exemplary embodiment of the present invention.

Referring to FIG. 6, a VCM (1000) performs an auto focus function along with a handshake compensation function.

The auto focus function is a function to drive a rotor (1100) from a stator (1200), and in order to perform the auto focus function, the rotor (1100) and a base (1300) mounted with a lens for performing the auto focus function are distanced from each other in a case the rotor (1100) and/or the stator (1200) are not applied with a driving signal.

The rotor (1100) is driven to a first direction distancing from the base (1300) as the driving signal lifting or floating the rotor (1100) floated from the base (1300) to perform a particular focus function (macro focus). The rotor (1100) is driven to a second direction nearing to the base (1300) to perform a particular focus function (infinity focus), in a case a driving signal for descending the rotor (1100) floated from the base (1300).

In a case mutually different driving signals are applied to the rotor (1100) floated from the base (1300), current consumption is reduced by reduction of current amount, whereby a low power consumption characteristic can be realized, and a driving distance of the rotor (1100) is reduced to further reduce a time consumed for auto focusing operation of the rotor (1100). Hereinafter, a VCM (1800) having an auto focus function and handshake compensation function by bidirectional driving thus described will be explained in detail.

Figure 7:
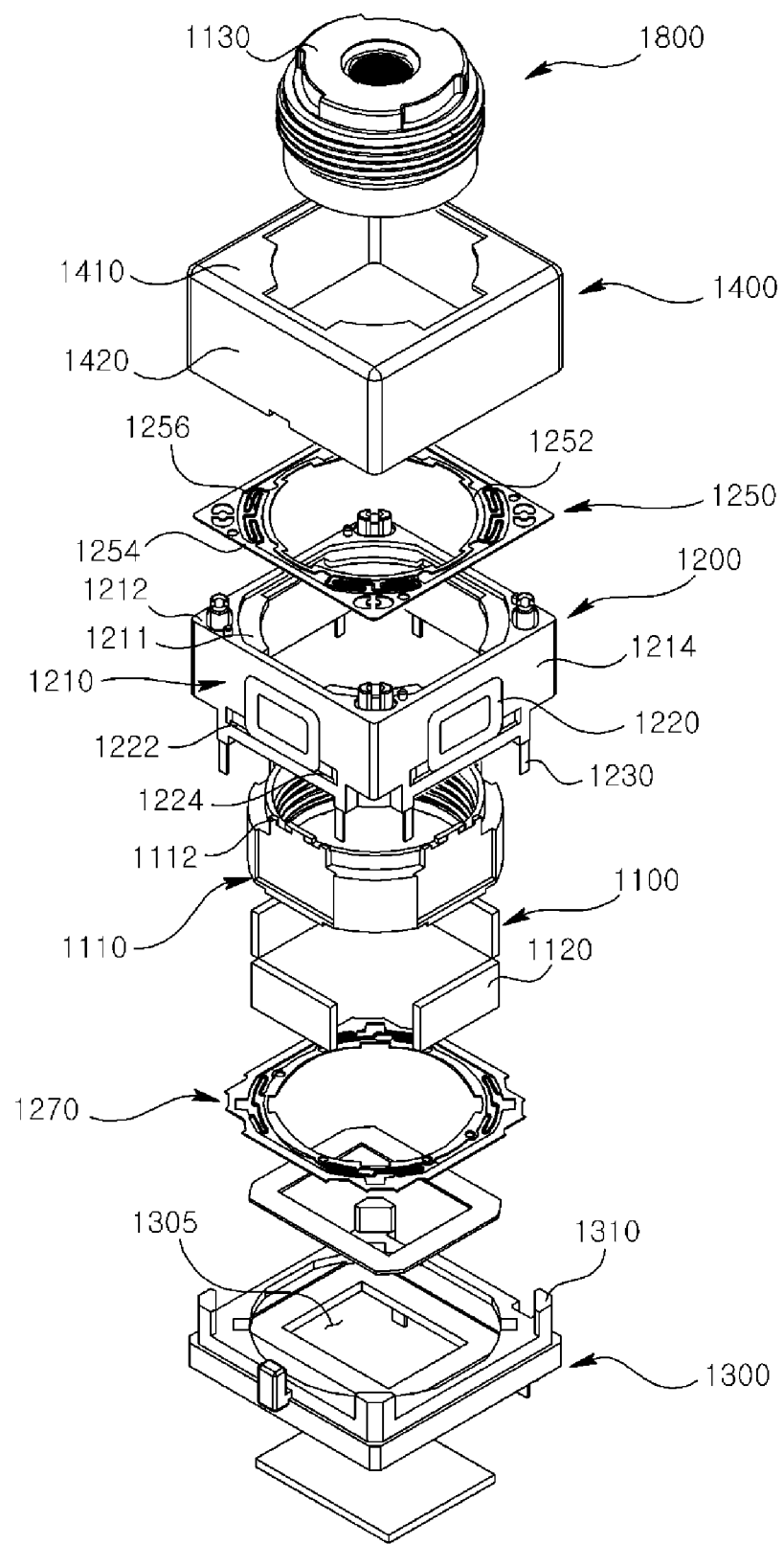
FIG. 7 is an exploded perspective view illustrating the VCM of FIG. 6.

FIG. 7 is an exploded perspective view illustrating the VCM of FIG. 6. Referring to FIGS. 6 and 7, the VCM (1800) includes a rotor (1100), a stator (1200), an elastic member (1250), a base (1300) and a case (1400).

The rotor (1100) includes a bobbin (1110) and a base (1300). The rotor (1100) performs an auto focusing function by being vertically moved at an upper surface of the base in response to interaction with the stator (1200, described later) and performs a handshake compensation function by being tilted at the upper surface of the base (1300).

The bobbin (1110) takes a cylindrical shape, for example, and is formed at an inner periphery with a female screw unit for being coupled with a lens (1130). The bobbin (1110) is formed with a coupling lug (1112) for being coupled to an elastic member (1250, described later). The bobbin (1110) is alternatively formed at an outer periphery with a curved section and a straight section. The bobbin (1110) is formed at the outer periphery with four (4) straight sections and four (4) curved sections.

Grooves concavely formed from a periphery of the bobbin (1110) are formed on the four straight sections formed on the periphery of the bobbin (1110). The first driving unit (1120) is oppositely coupled to the straight sections formed on the periphery of the bobbin (1110). By way of a non-limiting example, the first driving unit (1120) may be mutually oppositely arranged on two mutually facing straight sections among the four straight sections formed on the periphery of the bobbin (1110) or the four straight sections.

In the exemplary embodiment of the present disclosure, the first driving unit (1120) may include a magnet, where the magnet may be, by way of a non-limiting example, a two-pole magnet or a four-pole flat magnet. The stator (1200) includes a second driving unit (1220) and a terminal plate (1230).

Figure 8:
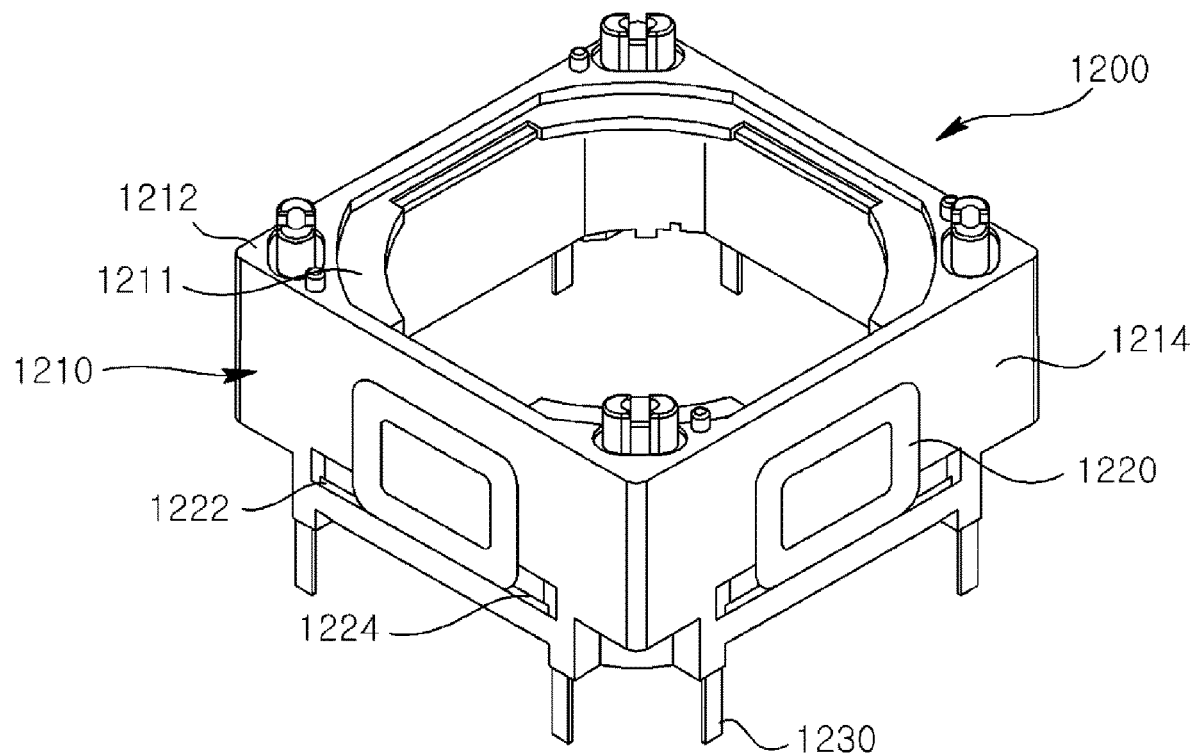
FIG. 8 is a perspective view illustrating a housing of FIG. 6.
Figure 9:
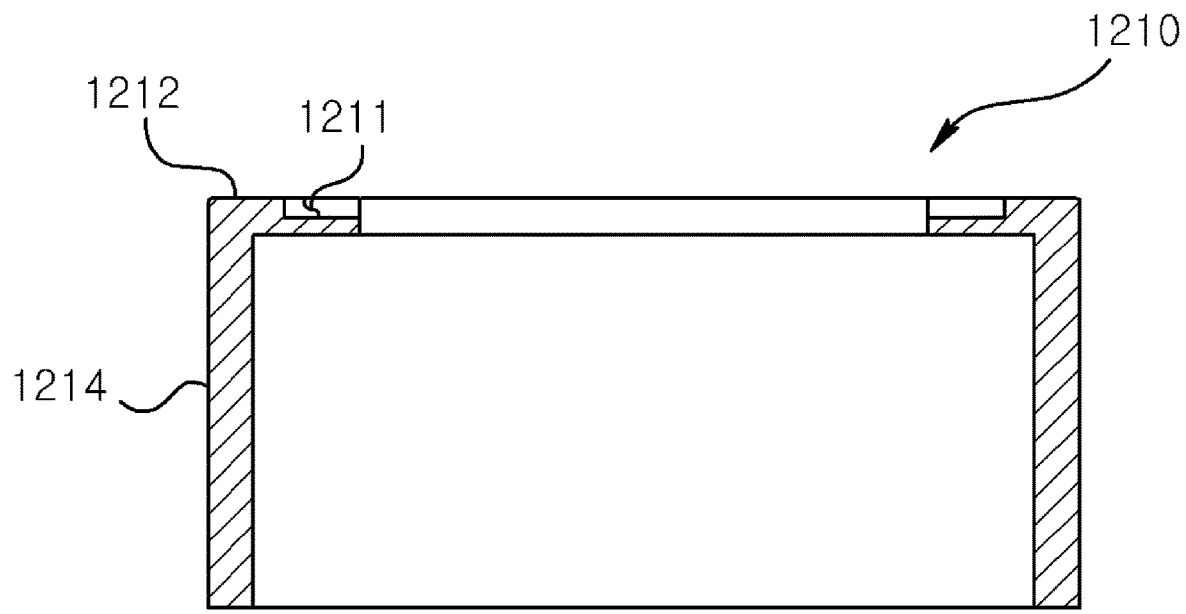
FIG. 9 is a cross-sectional view illustrating the housing of FIG. 6.

Now, referring to FIGS. 7, 8 and 9, the housing (1210) takes a shape of a square cylinder opened at a bottom. The housing (1210) may be formed by injection-molding process using synthetic resin, for example. The housing (1210) is arranged therein with the rotor (1100) and wraps the first driving unit (1120) arranged at the periphery of the rotor (1100).

In an exemplary embodiment of the present disclosure, the housing (1210) takes a shape of a square cylinder including an upper plate (1212) formed with an interference prevention unit (1211) and lateral walls (1214). The upper plate (1212) of the housing (1210) takes a shape of a square plate, when viewed from a top plan, and the upper plate (121) is centrally formed with an opening exposing a lens (1130). The lateral walls (1214) of the housing (1210) are extended to a direction wrapping the rotor (1110) from an edge of the upper plate (1212) of the housing (1210), and each of the lateral walls takes a shape of a plate.

The second driving unit (1220) of the stator (1200) is formed by winding a long wire coated with an insulation resin. In an exemplary embodiment of the present disclosure, the second driving unit (1220) includes a coil block wound in a shape of a square frame. In an exemplary embodiment of the present disclosure, four second driving units (1220) may be formed on the housing (1210, described later) for performing a handshake compensation function, each unit spaced apart at an equal distance.

One lateral end and the other lateral end facing the one lateral end of the second driving unit (1220) may be mutually oppositely formed relative to the second driving unit (1220). For way of a non-limiting example, the one lateral end of the second driving unit (1220) may be arranged at a left side of the second driving unit (1220), and the other lateral end of the second driving unit (1220) may be arranged at a right side of the second driving unit (1220).

The second driving unit (1220) has a predetermined thickness because of being formed with the long wire insulated by an insulation resin, and in a case the second driving unit (1220) having the predetermined thickness is arranged on the lateral wall (1214) of the housing (1210), the VCM (1800) may increase in terms of volume.

In an exemplary embodiment of the present disclosure, a part corresponding to the first driving unit (1120) of the rotor (1110) on a peripheral surface of the lateral wall (1214) of the housing (1210) is formed with an accommodation groove (not shown) in order to inhibit the VCM (1800) from increasing in terms of volume resultant from the second driving unit (1220). The accommodation groove formed on the peripheral surface of the lateral wall (1214) at the housing (1210) takes a shape corresponding to that of the second driving unit (1220). Depth of the accommodation groove is preferably formed greater than that of the second driving unit (1220) in order to inhibit the second driving unit (1220) from protruding from a periphery of the lateral wall (1214) of the housing (1210).

Although the exemplary embodiment of the present disclosure has explained and illustrated that an accommodation groove of groove shape is formed at the periphery of the lateral wall (1214) of the housing (1210), alternatively, the housing (1210) corresponding to the first driving unit (1120) may be formed with a through hole accommodating the second driving unit (1220)

Meanwhile, in a case the housing (1210) is arranged with the second driving unit (1220) corresponding to each of the first driving unit (1120), it is difficult to provide a driving signal to the second driving unit (1220). Particularly, in a case the housing (1210) is manufactured with a synthetic resin, it is more difficult to transmit a driving signal to the second driving unit (1220) from a PCB (Printed Circuit Board) arranged at a rear surface of the base (1300, described later).

The terminal plate (1230) serves to transmit to the second driving unit (1220) a driving signal provided from the PCB arranged at the rear surface of the base (1300). The terminal plate (1230) is manufactured in a form of a metal plate formed with a thin thickness, and a part or an entire part of the terminal plate (1230) contacting the second driving unit (1220) may be formed with a plated layer (described later) for improving an electric contact characteristic with the second driving unit (1220). The terminal plate (1230) is formed in parallel with the lateral wall (1214) of the housing (1210). The terminal plate (1230) is integrally formed with the housing (1210) by insert injection molding process. A part of the terminal plate (1230) inserted into the housing (1210) is exposed by the accommodation groove accommodating the second driving unit (1220).

Although the terminal plate (1230) inserted into the housing (1210) is explained and illustrated in the exemplary embodiment of the present disclosure, alternatively the terminal plate (1230) may be assembled by being inserted into an insertion groove formed at the housing (1210).

In the exemplary embodiment of the present disclosure, a distal end of the terminal plate (1230) is protruded at a predetermined length from a bottom surface of the housing (1210) to pass through the base (1300).

The terminal plate (1230) exposed by the accommodation groove of the housing (1210) is respectively contacted by one lateral end (1222) and the other lateral end (1224) of the second driving unit (1220), and the terminal plate (1230) is electrically connected by the one lateral end and the other lateral end (1222, 1224) of the second driving unit (1220). The terminal plate (1230) and the one lateral end (1222) of the second driving unit (1220), and the terminal plate (1230) and the other lateral end (1224) of the second driving unit (1220) are mutually and electrically connected by a connection member.

By way of a non-limiting example, the connection member may be a low melting point, metal solder electrically connecting the one lateral end (1222) of the second driving unit (1220) and the plate terminal (1230), and the other lateral end (1224) of the second driving unit (1220) and the terminal plate (1230). At this time, in a case a wire forming the second driving unit (1220) includes a copper, it is preferable, as explained above, that a plated layer be formed at a part on the terminal plate (1230), where the one lateral end (1222) and the other lateral end (1224) of the second driving unit (1220) are connected, because of bad connection characteristic of the plate terminal (1230) and the second driving unit (1220). Alternatively, the connection member may include a conductive adhesive having adhesive power and conductivity.

Referring to FIG. 7 again, the base (1300) takes a shape of a cube, and base (1300) is centrally formed with an opening (1305). The base (1300) is protrusively formed with a coupling pillar (1310) for being coupled with the housing (1200). The coupling pillar (1310) of the base (1300) and a coupling groove formed at the housing corresponding to the coupling pillar (1310) are coupled by a press-fitting method. The base (1300) is mounted at a rear surface with an IR (Infrared) filter and an image sensor module.

The case (1400) wraps the stator (1200) wrapping the rotor (1100), and inhibits electromagnetic wave generated from the second driving unit (1220) of the stator (1200) or electromagnetic wave coming from outside from being applied to the second driving unit (1220).

The case (1400) may be formed by press work of a metal plate for interrupting the electromagnetic wave. The case (1400) includes an upper plate (1410) and a lateral plate (1420). The upper plate (1410) and the lateral plate (1420) are integrally formed.

The upper plate (1410), when viewed from a top plan, takes a shape of a square plate, and the upper plate (1410) is centrally formed with an opening (1405) exposing a lens (1130). An area (plane) of the opening (1405) at the upper plate (1410) is formed greater than that of the bobbin (1110) to allow the bobbin (1110) mounted with the lens (1130) to get in or get out of the opening of the upper plate (1410).

The lateral plate (1420) is extended from an edge of the upper plate (1410) along a periphery of the lateral wall (1214) of the housing (1210) at the stator (1200), and the lateral plate (1420) is fixed to the base (1300).

An elastic member (1250) is coupled to an upper end of the rotor (1100) to elastically support the rotor (1100), and the elastic member (1250) elastically supports the rotor (1100) to allow the rotor (1100) to float from the base (1300) in a case no driving signal is applied to the rotor (1100) and/or the stator (1200). The rotor (1100) is bi-directionally driven relative to the base (1300) to perform the auto focusing or handshake compensation functions while the elastic member (1250) allows the rotor (1100) to float from an upper surface of the base (1300). The elastic member (1250) includes an inner elastic unit (1252), an outer elastic unit (1254) and an elastic connection unit (1256).

The inner elastic unit (1252) is coupled to a coupling lug (1112) formed at an upper surface of the bobbin (1110), and the inner elastic unit (1252) may be shaped of a round ring, for example.

The outer elastic unit (1254) is arranged outside of the inner elastic unit (1252), and the outer elastic unit (1254) takes a shape of a strip, for example, and is arranged on an upper plate (1212) of the housing (1210).

The elastic connection unit (1256) connects the outer elastic unit (1254) and the inner elastic unit (1252) to provide elasticity to the inner elastic unit (1252). The elastic connection unit (1256) takes a shape of a long strip generating elasticity by being bent in a zigzag style.

Meanwhile, an additional elastic member (1270) takes a shape similar to that of the elastic member (1250), and the additional elastic member (1270) is coupled to a bottom surface of the bobbin (1110) to elastically support the bobbin (1110).

The VCM (1800) according to an exemplary embodiment of the present disclosure is such that, in a case no driving signal is applied to the first and second driving units (1120, 1220), the rotor (1100) is distanced from the upper surface of the base by the elastic member (1250) to maintain a floated state.

The rotor (1100) floated by being distanced from the upper surface of the base (1300) in a case no driving signal is applied to the first and second driving units (1120, 1220) is driven to a direction distancing from the upper surface of the base (1300) or to a direction nearing to the upper surface of the base (1300) in response to the driving signal applied to the first and second driving units (1120, 1220).

Particularly, in a case the rotor (1100) is driven to a direction nearing to the upper surface of the base (1300) in response to the driving signal applied to the first and second driving units (1120, 1220), the elastic connection unit (1256) of the elastic member (1250) arranged at the upper surface (1212) of the housing (1210) at the stator (1200) and the inner elastic unit (1252) also move downwardly along with the rotor (1100), where the elastic connection unit (1256) is brought into contact with the upper plate (1212) of the housing (1210) by displacement of the elastic connection unit (1256) of the elastic member (1250), whereby the rotor (1100) is inhibited from being normally driven.

Although the driving fault of the rotor (1100) is not generated on a unidirectional driving VCM driven to one direction distancing from the upper surface of the base, the rotor (1100) may be driven to a direction nearing to the upper surface of the base (1300) in a bi-directionally driven VCM according to the exemplary embodiment of the present disclosure.

Hence, as illustrated in FIGS. 7 to 9, an interference prevention unit (1211) is formed, according to an exemplary embodiment of the present disclosure, on the upper plate (1212) of the housing (1210) in order to inhibit an interference of the upper plate (1212) of the housing (1210) and the elastic connection unit (1256) of the elastic member (1250) causing a driving fault of the rotor (1100) generated by bidirectional driving of the rotor (1100). The interference prevention unit (1211) formed on the upper plate (1212) of the housing (1210) is formed on the upper plate (1212) of the housing (1210) is formed in a shape of a concave recess about an opening exposing the lens (1130).

The interference prevention unit (1211) according to an exemplary embodiment of the present disclosure may be selectively formed at a position corresponding to that of the elastic connection unit (1256) of the elastic member (1250) at the upper plate (1212) of the housing (1210).

Referring to FIG. 9, a floor surface of the interference prevention unit (1211) concavely formed on the upper plate (1212) of the housing (1210) may be formed in parallel with the upper plate (1212) of the housing (1210). Alternatively, the interference prevention unit (1211) according to an exemplary embodiment of the present disclosure may be continuously formed along an ambience of the opening formed on the upper plate (1212) of the housing (1210).

Figure 10:
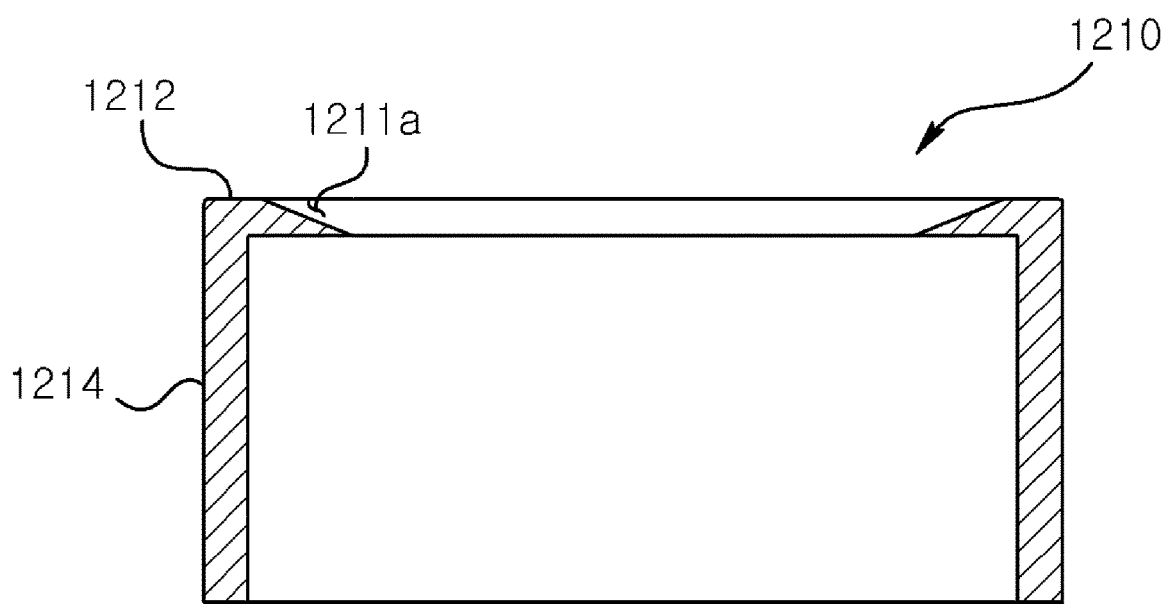
FIG. 10 is a cross-sectional view illustrating the housing according to another exemplary embodiment of the present invention.

FIG. 10 is a cross-sectional view illustrating an interference prevention unit of a housing according to an exemplary embodiment of the present invention.

Referring to FIG. 10, an interference prevention unit (1211a) formed on an upper plate (1212) of a housing (1210) and formed in a shape of a concave recess about an opening exposing a lens (1130) is formed downwardly and slantly formed relative to the upper plate (1212) of the housing (1210) in response to movement of an elastic connection unit (1256) of an elastic member (1250).

Although the exemplary embodiment of the present disclosure has illustrated and explained the interference prevention unit (1211) is formed on an upper plate (1212) of a housing (1210) and formed in a shape of a concave recess about an opening exposing a lens (1130), the interference prevention unit (1211) may be formed with an opening for passing a part corresponding to the elastic connection unit (1256) of the elastic member (1250) on the upper plate (1212) of the housing (1210).

Furthermore, in a case the interference prevention unit (1211) is an opening for passing a part corresponding to the elastic connection unit (1256) of the elastic member (1250) on the upper plate (1212) of the housing (1210), an opening area of the interference prevention unit (1211) may be formed greater than an area of the elastic connection unit (1256) at the elastic member (1250).

Figure 11:
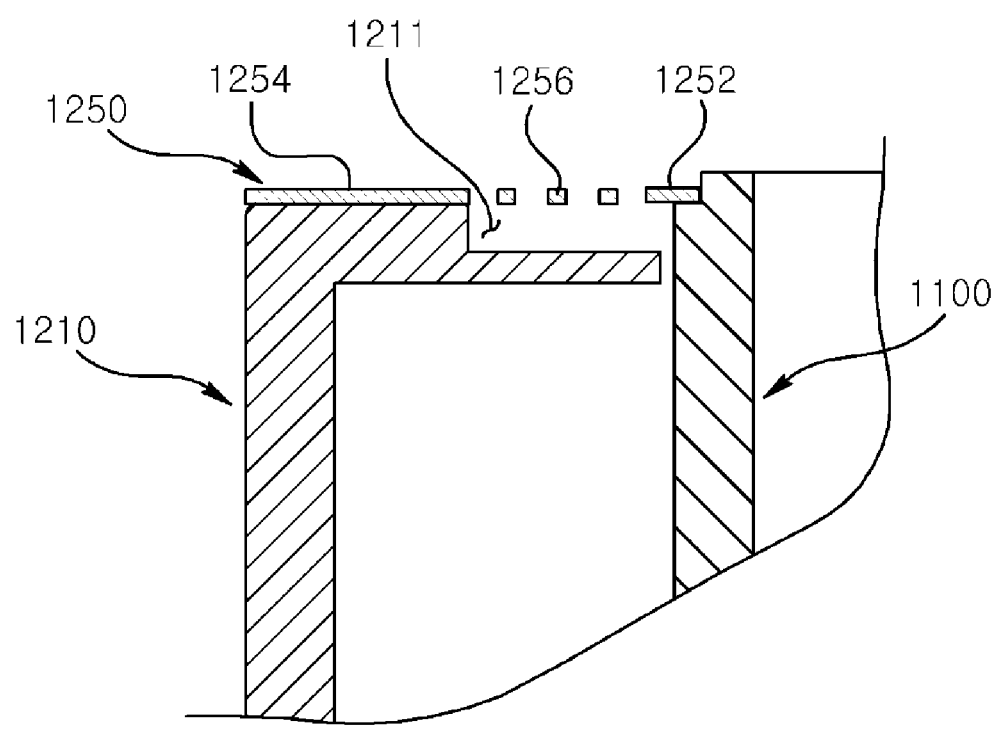
FIG. 11 is a cross-sectional view illustrating a bobbin of FIG. 6 in a stopped state.

Now, operation of the rotor (1100) in the VCM (1800) will be described with reference to FIGS. 11, 12 and 13. In a case no driving signal is applied to the first and second driving units (1120, 1220), a floated state of the rotor (1100) is maintained by the elastic member (1250) relative to the upper surface of the base (1300) as illustrated in FIG. 13.

Figure 12:
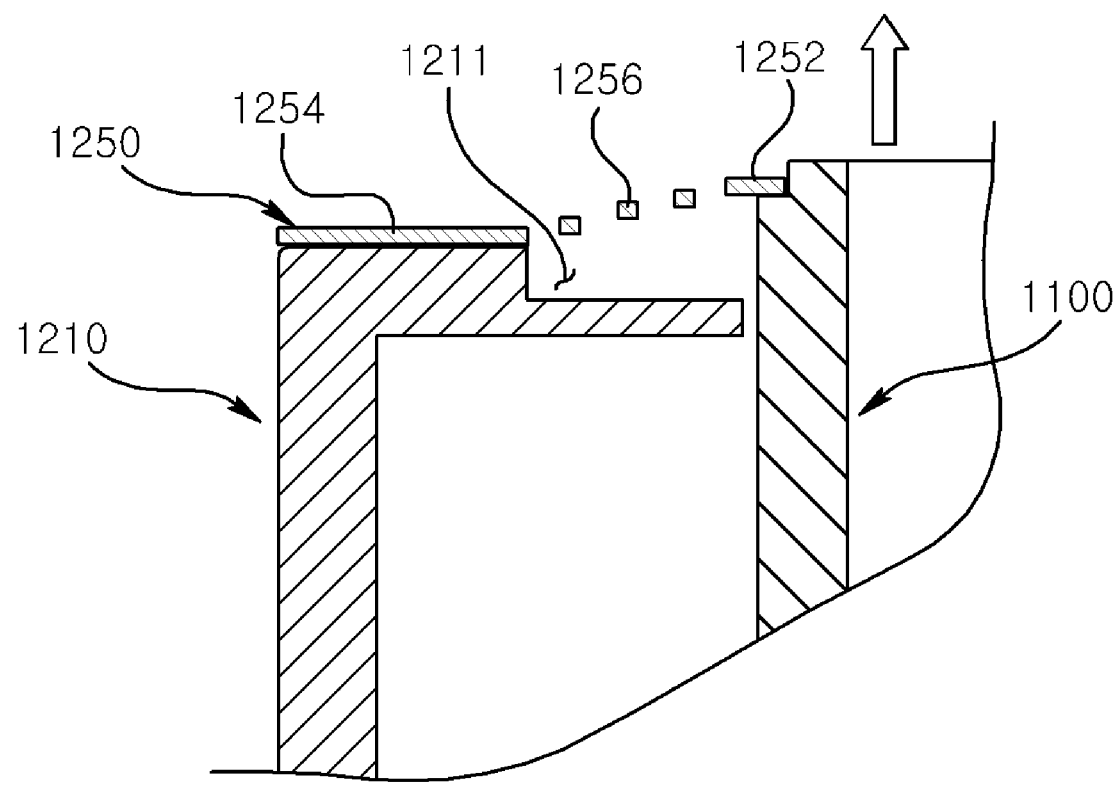
FIG. 12 is a cross-sectional view illustrating a state of the bobbin of FIG. 6 lifted to a direction distancing from a base.
Figure 13:
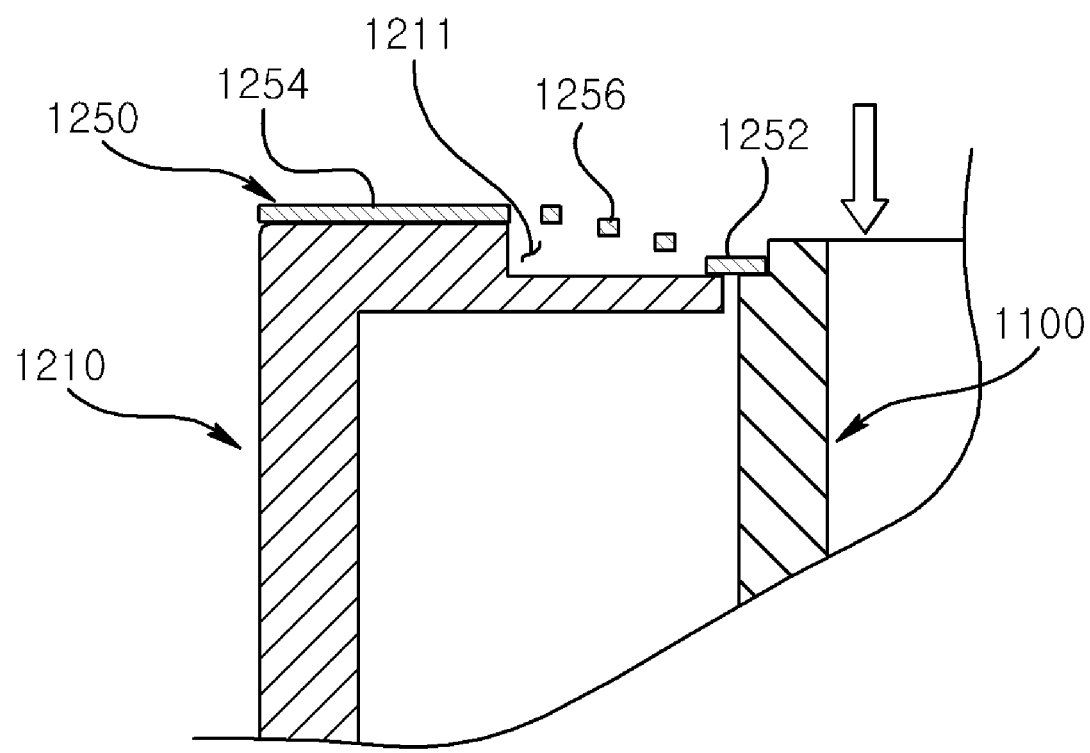
FIG. 13 is a cross-sectional view illustrating a state of the bobbin of FIG. 1 descended to a direction approaching the base.

In a case the driving signal is applied to the first and second driving units (1120, 1220) to allow the rotor (1100) to be distanced from the upper surface of the base (1300) as illustrated in FIG. 12, the inner elastic unit (1252) and the elastic connection unit (1256) at the elastic member (1250) ascend along with the rotor (1100) to inhibit the elastic member (1250) from generating interference.

Meanwhile, In a case the driving signal is applied to the first and second driving units (1120, 1220) to allow the rotor (1100) to be driven to a direction nearing to the upper surface of the base (1300) as illustrated in FIG. 8, the inner elastic unit (1252) and the elastic connection unit (1256) at the elastic member (1250) may descend along with the rotor (1100) to allow the elastic connection unit (1256) of the elastic member (1250) to be brought into contact with the upper plate (1212) of the housing (1210). However, in the exemplary embodiment of the present disclosure, the interference prevention unit (1211) inhibiting the upper plate (1212) of the housing (1210) from contacting the elastic connection unit (1256) is formed on the upper plate (1212) of the housing (1210) to inhibit the elastic connection unit (1256) of the elastic member (1250) from mutually contacting the housing (1210).

As apparent from the foregoing detailed description, the rotor maintains a state of being distanced from the base in case of no driving signal, the rotor is bi-directionally driven to a direction distancing from the base or to a direction facing the base in response to the application of the driving signal, and particularly, the elastic member coupled to the rotor is inhibited from generating a mutual interference with the upper plate of the housing fixing the second driving unit in a case the rotor is driven to a direction facing the base, whereby the VCM is inhibited from generating a driving fault during the focusing operation.

Third Exemplary Embodiment

Hereinafter, a third exemplary embodiment of the present disclosure will be described, where different reference numerals will be provided to the same configuration as that of the first and second exemplary embodiments of the present disclosure in order to distinguish the third exemplary embodiment from the first and second exemplary embodiments.

Figure 14:
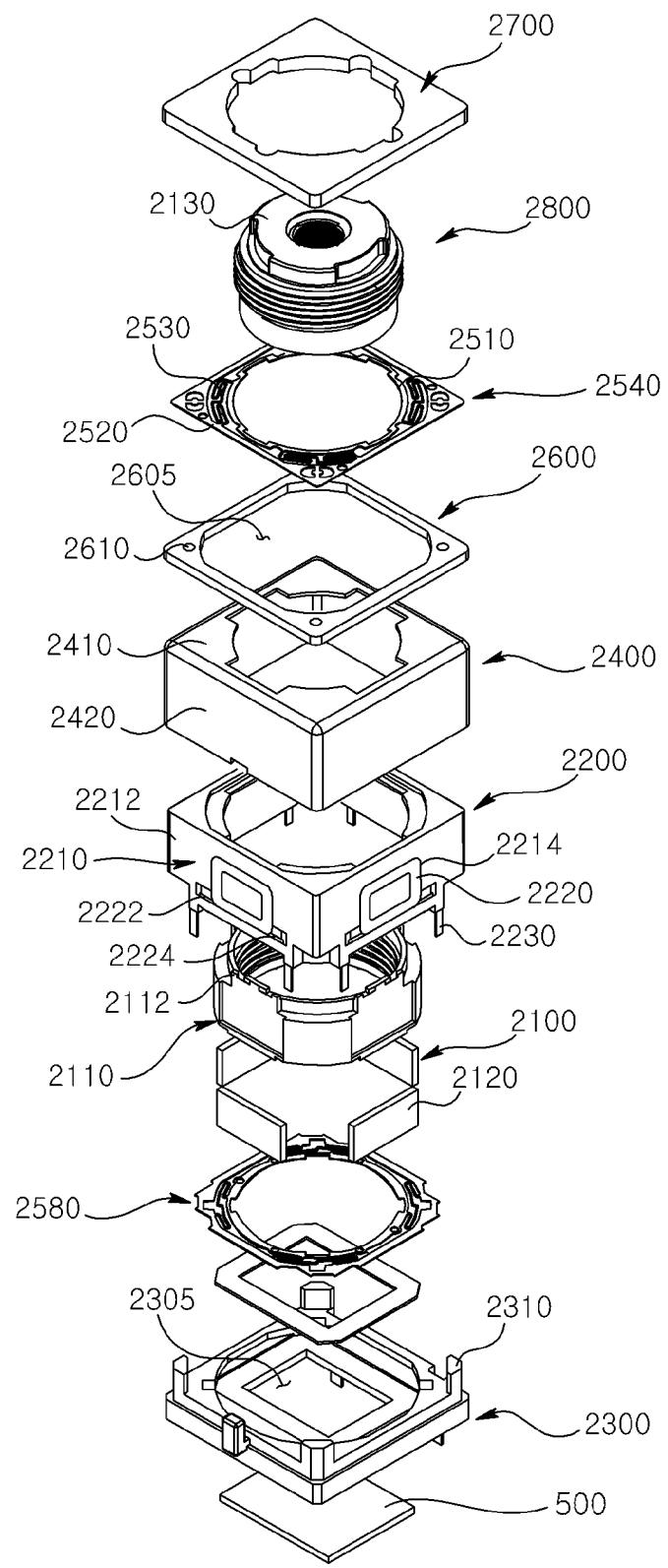
FIG. 14 is an exploded perspective view illustrating the VCM of FIG. 6.

FIG. 14 is an exploded perspective view illustrating the VCM of FIG. 6.

Referring to FIG. 14, a VCM (2800) includes a rotor (2100), a stator (2200), a base (2300), a case (2400), an elastic member (2540), an interference prevention unit (2600) and a cover member (2700).

The rotor (2100) includes a bobbin (2110) and a first driving unit (2120). The rotor (2100) vertically moves on the base in response to interaction with the stator (2200, described later) to perform the auto focusing function and to perform a handshake compensation function by tilting on the base (2300). The bobbin takes a shape of a cylinder, for example, and the bobbin (2110) is formed at an inner circumferential surface with a female screw unit for being coupled to a lens (2130). The bobbin (2110) is formed with a coupling lug (2112) for being coupled to the elastic member (2540, described later). A periphery of the bobbin (2110) is alternately formed with a curve section and a straight section. The bobbin (2110) is formed at the outer periphery with four (4) straight sections and four (4) curved sections.

Grooves concavely formed from the periphery of the bobbin (2110) are formed on the four straight sections formed on the periphery of the bobbin (2110). The first driving unit (2120) is oppositely coupled to the straight sections formed on the periphery of the bobbin (2110). By way of a non-limiting example, the first driving unit (2120) may be mutually oppositely arranged on two mutually facing straight sections among the four straight sections formed on the periphery of the bobbin (2110) or on the four straight sections.

In the exemplary embodiment of the present disclosure, the first driving unit (2120) may include a magnet, where the magnet may be, by way of a non-limiting example, a two-pole magnet or a four-pole flat magnet. The stator (2200) includes a housing (2210), a second driving unit (220) and a terminal plate (2230).

The housing (2210) takes a shape of a square cylinder opened at an upper surface and a bottom surface. The housing (2210) is arranged therein with the rotor (2200), and the housing (2210) wraps a first driving unit (2120) arranged at the periphery of the bobbin (2110) of the rotor (2100).

In an exemplary embodiment of the present disclosure, the housing (2210) takes a shape of a square cylinder including four lateral walls (2212). The housing (2210) may be formed by injection molding process using synthetic resin, for example.

The second driving unit (2220) is formed by winding a long wire coated with an insulation resin. In an exemplary embodiment of the present disclosure, the second driving unit (2220) includes a coil block wound in a shape of a square frame. In an exemplary embodiment of the present disclosure, four second driving units (2220) may be formed on the housing (2210, described later) for performing a handshake compensation function, each unit spaced apart at an equal distance.

One lateral end and the other lateral end facing the one lateral end of the second driving unit (2220) may be mutually oppositely formed relative to the second driving unit (2220). By way of a non-limiting example, the one lateral end of the second driving unit (2220) may be arranged at a left side of the second driving unit (2220), and the other lateral end of the second driving unit (2220) may be arranged at a right side of the second driving unit (2220).

The second driving unit (2220) has a predetermined thickness because of being formed with the long wire insulated by an insulation resin, and in a case the second driving unit (2220) having the predetermined thickness is arranged on the lateral wall (2212) of the housing (2210), a VCM (2800) may increase in terms of volume.

In an exemplary embodiment of the present disclosure, a part corresponding to the first driving unit (2120) of the rotor (2110) on a peripheral surface of the lateral wall (2212) of the housing (2210) is formed with an accommodation groove (2214) in order to inhibit the VCM (2800) from increasing in terms of volume resultant from the second driving unit (2220). The accommodation groove (2214) formed on the peripheral surface of the lateral wall (2212) at the housing (2210) takes a shape corresponding to that of the second driving unit (2220). Depth of the accommodation groove (2214) is preferably formed greater than that of the second driving unit (2220) in order to inhibit the second driving unit (2220) from protruding from a periphery of the lateral wall (2212) of the housing (2210).

Although the exemplary embodiment of the present disclosure has explained and illustrated that an accommodation groove (2214) of groove shape is formed at the periphery of the lateral wall (2212) of the housing (2210), alternatively, the housing (2210) corresponding to the first driving unit (2120) may be formed with a through hole accommodating the second driving unit (2220).

Meanwhile, in a case the housing (2210) is arranged with the second driving unit (2220) corresponding to each of the first driving unit (2120), it is difficult to provide a driving signal to the second driving unit (2220). Particularly, in a case the housing (2210) is manufactured with a synthetic resin, it is more difficult to transmit a driving signal to the second driving unit (2220) from a PCB (Printed Circuit Board) arranged at a rear surface of the base (2300, described later).

The terminal plate (2230) serves to transmit to the second driving unit (2220) a driving signal provided from the PCB arranged at the rear surface of the base (2300). The terminal plate (2230) is manufactured in a form of a metal plate formed with a thin thickness, and a part or an entire part of the terminal plate (2230) contacting the second driving unit (2220) may be formed with a plated layer (described later) for improving an electric contact characteristic with the second driving unit (2220). The terminal plate (2230) is formed in parallel with the lateral wall (2212) of the housing (2210). The terminal plate (2230) is integrally formed with the housing (2210) by insert injection molding process. A part of the terminal plate (2230) inserted into the housing (2210) is exposed by the accommodation groove (2214) accommodating the second driving unit (2220).

Although the terminal plate (2230) inserted into the housing (2210) is explained and illustrated in the exemplary embodiment of the present disclosure, alternatively the terminal plate (2230) may be assembled by being inserted into an insertion groove formed at the housing (2210).

In the exemplary embodiment of the present disclosure, a distal end of the terminal plate (2230) is protruded at a predetermined length from a bottom surface of the housing (2210) to pass through the base (2300).

The terminal plate (2230) exposed by the accommodation groove (2214) of the housing (2210) is respectively contacted by one lateral end (2222) and the other lateral end (2224) of the second driving unit (2220), and the terminal plate (2230) is electrically connected by the one lateral end and the other lateral end (2222, 2224) of the second driving unit (2220). The terminal plate (2230) and the one lateral end (2222) of the second driving unit (2220), and the terminal plate (2230) and the other lateral end (2224) of the second driving unit (2220) are mutually and electrically connected by a connection member.

By way of a non-limiting example, the connection member may be a low melting point, metal solder electrically connecting the one lateral end (2222) of the second driving unit (2220) and the plate terminal (2230), and the other lateral end (2224) of the second driving unit (2220) and the terminal plate (2230). At this time, in a case a wire forming the second driving unit (2220) includes a copper, it is preferable, as explained above, that the plated layer be formed at a part on the terminal plate (2230) where the one lateral end (2222) and the other lateral end (2224) of the second driving unit (2220) are connected, because of bad connection characteristic of the plate terminal (2230) and the second driving unit (1220). Alternatively, the connection member may include a conductive adhesive having adhesive power and conductivity.

Referring to FIG. 14 again, the base (2300) takes a shape of a cube, and base (2300) is centrally formed with an opening (2305). The base (2300) is protrusively formed with a coupling pillar (2310) for being coupled with the housing (2200). The coupling pillar (2310) of the base (2300) and a coupling groove formed at the housing (2200) corresponding to the coupling pillar (2310) are coupled by a press-fitting method. The base (2300) is mounted at a rear surface with an IR (Infrared) filter and an image sensor module.

The case (2400) wraps the stator (2200) wrapping the rotor (2100), and inhibits electromagnetic wave generated from the second driving unit (2220) of the stator (2200) or electromagnetic wave coming from outside from being applied to the second driving unit (2220). The case (2400) may be formed by press work of a metal plate for interrupting the electromagnetic wave. The case (1400) includes an upper plate (410) and a lateral plate (2420). The upper plate (2410) and the lateral plate (2420) are integrally formed.

The upper plate (2410), when viewed from a top plan, takes a shape of a square plate, and the upper plate (2410) is centrally formed with an opening (2405) exposing a lens (2130). An area (plane) of the opening (2405) at the upper plate (2410) is formed greater than that of the bobbin (2110) to allow the bobbin (2110) mounted with the lens (2130) to get in or get out of the opening of the upper plate (2410).

The lateral plate (2420) is extended from an edge of the upper plate (2410) along a periphery of the lateral wall (2212) of the housing (2210) at the stator (2200), and the lateral plate (2420) is fixed to the base (2300).

Figure 15:
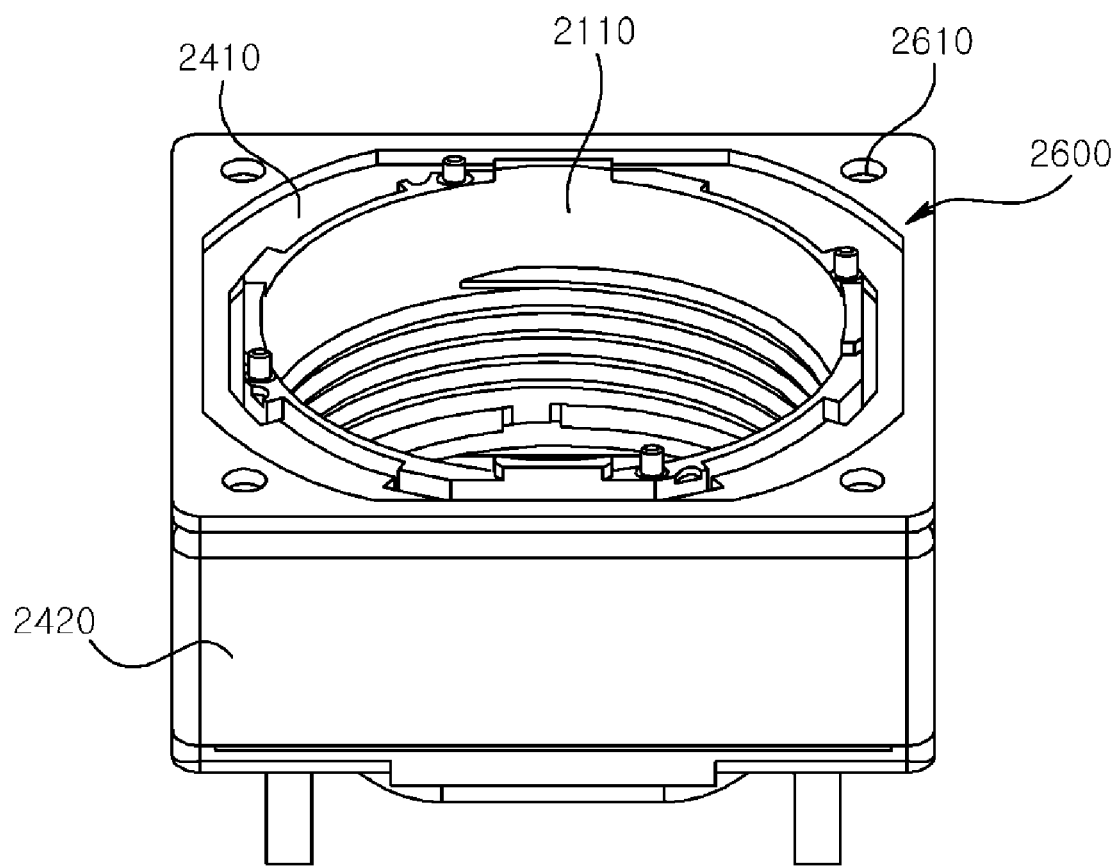
FIG. 15 is a perspective view illustrating a VCM removed of a cover member and an elastic member of FIG. 6.
Figure 16:
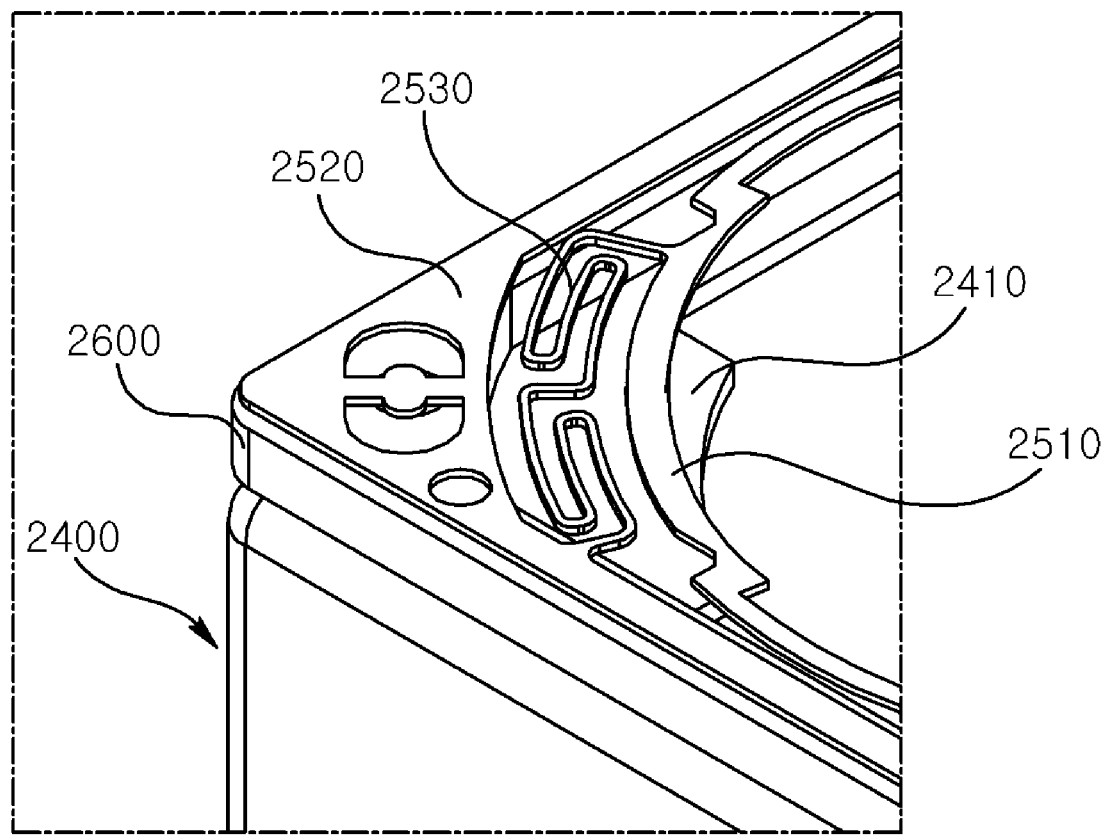
FIG. 16 is a plan illustrating parts of a case, an interference prevention unit and an elastic member of FIG. 6.

Referring to FIGS. 14, 15 and 15, an elastic member (2540) is coupled to the rotor (2100) to elastically support the rotor (2100), and the elastic member (2540) elastically supports the rotor (2100) to allow the rotor (2100) to float from the base (2300) in a case no driving signal is applied to the rotor (2100) and/or to the stator (2200). The rotor (2100) is bi-directionally driven relative to the base (2300) to perform the auto focusing function by causing the elastic member (2540) to allow the rotor (2100) to float from the base (2300). The elastic member (2540) includes an inner elastic unit (2510), an outer elastic unit (2520 and an elastic connection unit (2530).

The inner elastic unit (2510) is coupled to a coupling lug (2112) formed at the bobbin (2110), and the inner elastic unit (2510) may be shaped of a round ring, for example.

The outer elastic unit (2520) is arranged outside of the inner elastic unit (2510), and the outer elastic unit (2520) takes a shape of a strip.

The elastic connection unit (2530) connects the inner elastic unit (2510) and the outer elastic unit (2520) to provide elasticity to the inner elastic unit (2510). The elastic connection unit (2530) takes a shape of a long strip generating elasticity by being bent in a zigzag style. The elastic member (2540) including the inner elastic unit (2510), the outer elastic unit (2520) and the elastic connection unit (2530) is not arranged inside an upper plate (2410) of the case (2400) but on the upper plate (2410).

An additional elastic member (2580) takes a shape similar to that of the elastic member (2540), and the additional elastic member (2580) is coupled to a bottom surface of the bobbin (2110) to elastically support the bobbin (2110).

An interference prevention unit (2600) is interposed between the upper plate (2410) of the case (2400) and the elastic member (2540). The interference prevention unit (2600) is driven to a direction where the bobbin (2110) coupled to the inner elastic unit (2510) of the elastic member (2540) gets closer to the base (2300), and inhibits generation of a focus operation fault of the bobbin (2110) caused by interference between the elastic connection unit (2530) and the upper plate (2410) arranged underneath the elastic connection unit (2530) during performance of focusing operation.

By way of non-limiting example, in a case the interference prevention unit (2600) is not formed between the elastic member (2540) and the upper plate (2410) of the case (2400), the upper plate (2410) should not contact the elastic connection unit (2530) of the elastic member (2540), where an area of an opening (2405) of the upper plate (2410) must be further increased to realize the non-contact without the interference prevention unit (2600).

In a case the area of the opening (2405) of the upper plate (2410) is further increased, foreign objects may enter the VCM (2800) through the opening (2405) to be collected at an inside of the VCM (2800), whereby a defect development rate of the VCM (2800) increases to shorten the life of the VCM (2800). In order to inhibit the increased defect development rate from increasing, an interference prevention unit (2600) is interposed between the elastic member (2540) and the upper plate (2410) of the case (2400).

The interference prevention unit (2600) is formed in a shape of a steel plate formed therein with an opening (2605), and the interference prevention unit (2600) may be formed by a punching process of a metal plate or an injection molding process of synthetic resin.

Thickness of the interference prevention unit (2600) is so formed as to inhibit the elastic connection unit (2530) of the elastic member (2540) vertically moving along a stroke length of the bobbin (2110) of the rotor (2100) from contacting the upper plate (2410). The interference prevention unit (2600) formed on the upper plate (2410) of the case (2400) is fixed to the upper plate (2410) by various methods including a spot welding, a laser welding or a soldering. Meanwhile, in a case the interference prevention unit (2600) is an injection molded body of synthetic resin, the interference prevention unit (2600) is fixed to the upper surface of the upper plate (2410) using an adhesive.

In order to allow the interference prevention unit (2600) to be precisely arranged on a designated position, the interference prevention unit (2600) is formed with a guide hole (2610) for aligning the position. Meanwhile, a guide lug coupled to the guide hole (2610) of the interference prevention unit (2600) may be formed on the upper plate (2410) corresponding to the guide hole (2610). An area of the opening (2605) at the interference prevention unit (2600) is formed greater than that of the opening (2405) of the upper plate (2410) of the case (2400).

Hence, a part of the upper plate (2410) of the case (2400) is exposed instead of being covered by the interference prevention unit (2600) in a case the interference prevention unit (2600) is coupled to the designated position of the upper plate (2410), where the exposed part is a part corresponding to the elastic connection unit (2530) of the elastic member (2540).

That is, in a case the interference prevention unit (2600) is arranged on the upper plate (2410), and the outer elastic unit (2520) of the elastic member (2540) is arranged on an upper surface of the interference prevention unit (2600), a gap corresponding to a thickness of the interference prevention unit (2600) is formed between the elastic connection unit (2530) of the elastic member (2540) and the upper plate (2410).

Figure 17:
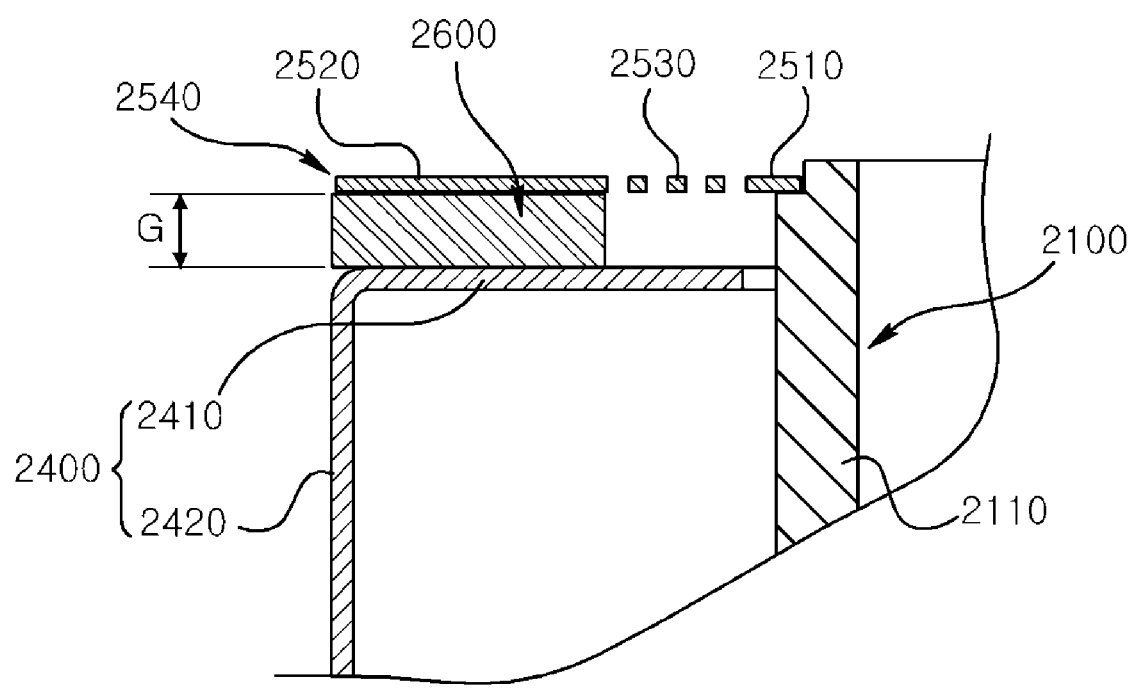
FIG. 17 is a cross-sectional view illustrating a case, an interference prevention unit, an elastic member and a bobbin.
Figure 19:
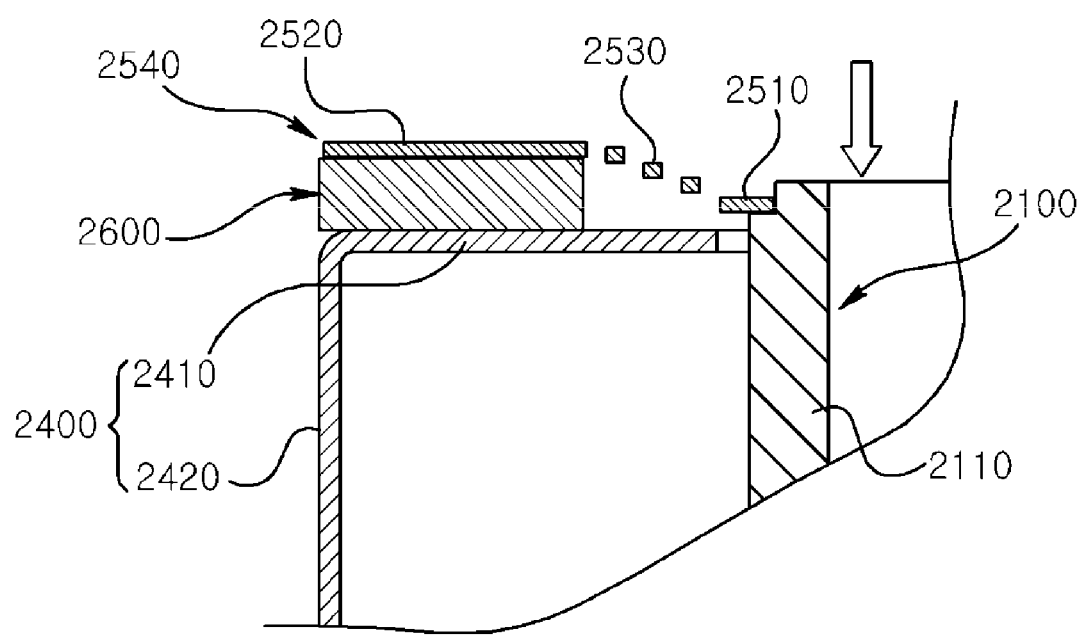
FIG. 19 is a cross-sectional view illustrating a state of the bobbin of FIG. 17 being descended toward the base.

In a case the gap (G) is formed between the elastic connection unit (2530) of the elastic member (2540) and the upper plate (2410) by the interference prevention unit (2600) as illustrated in FIG. 17, an interference caused by contact between the elastic connection unit (2530) of the elastic member (2540) and the upper plate (2410) can be inhibited even if the bobbin (2110) is driven to a direction approaching the base (2300) as in FIG. 19.

Figure 18:
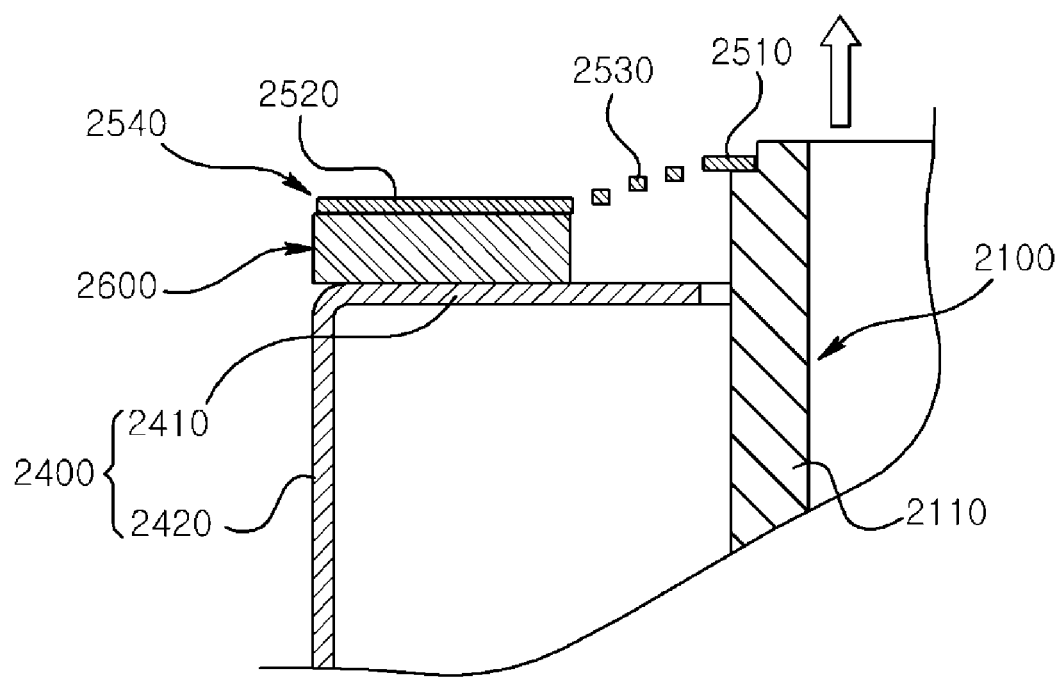
FIG. 18 is a cross-sectional view illustrating a state of the bobbin of FIG. 17 being lifted from the base.

Referring to FIGS. 7, 17 and 19, in a case a driving signal raising the rotor (2100) is applied to the stator (2200), the bobbin (2110) of the rotor (2100) ascends as illustrated in FIG. 18, and the inner elastic unit (2510) and the elastic connection unit (2530) of the elastic member (2540) move upwards. Conversely, in a case a driving signal descending the rotor (2100) is applied to the stator (2200), the bobbin (2110) of the rotor (2100) descends as illustrated in FIG. 19, and the inner elastic unit (2510) and the elastic connection unit (2530) of the elastic member (2540) move downwards.

The elastic connection unit (2530) of the elastic member (2540) move downwards along with the rotor (2100) in response to the descent of the rotor (2100), whereby the elastic connection unit (2530) is not contacted to or interfered with the upper plate (2410) by the thickness of the interference prevention unit (2600).

The cover member (2700) includes an opening exposing the lens (2130), and the cover member (2700) fixes the elastic member (2540) by pressing the elastic member (2540) arranged on the case (2400).

As apparent from the foregoing detailed description, the rotor maintains a state of being distanced from the base in case of no driving signal being applied, the rotor is bi-directionally driven to a direction distancing from the base or to a direction facing the base in response to the application of the driving signal, and particularly, the elastic member coupled to the rotor and the case covering the rotor are inhibited from generating a mutual interference in a case the rotor is driven to a direction facing the base, whereby the VCM is inhibited from generating a driving fault during the focusing operation.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

What is claimed is:

1. A VCM (Voice Coil Motor) comprising:
    a base;
    a case disposed on the base and comprising an upper plate and a lateral plate;
    a bobbin disposed in the case;
    a housing disposed between the bobbin and the case;
    a coil and a magnet disposed in the case and configured to move the bobbin; and
    an upper elastic member connecting the bobbin and the housing,
    wherein the bobbin is configured to move for an auto focus function and a handshake compensation function,
    wherein the upper elastic member comprises an inner elastic unit coupled to the bobbin, an outer elastic unit coupled to an upper surface of the housing, and an elastic connection unit connecting the inner elastic unit and the outer elastic unit,
    wherein the housing comprises a recess concavely formed on the upper surface of the housing, and
    wherein the recess of the housing is overlapped with the elastic connection unit of the upper elastic member.

2. The VCM of claim 1, wherein the recess of the housing forms a space in which the elastic connection unit is disposed when the inner elastic unit moves to a position lower than the outer elastic unit.

3. The VCM of claim 1, wherein the bobbin is spaced apart from the base at an initial position when no current is applied to the coil, and
    wherein the bobbin is configured to move from the initial position in a first direction approaching the base within a first stroke length when a backward current is applied to the coil.

4. The VCM of claim 3, wherein the recess of the housing comprises a floor surface facing the elastic connection unit, and
    wherein, in an optical axis direction, a distance between the upper surface of the housing and the floor surface of the recess is greater than the first stroke length of the bobbin.

5. The VCM of claim 1, wherein the bobbin is configured to be tilted on an upper surface of the base for the handshake compensation function.

6. The VCM of claim 3, wherein the bobbin is spaced apart from the case at an initial position when no current is applied to the coil,
    wherein the bobbin is configured to move from the initial position in a second direction approaching the upper plate of the case within a second stroke length when a forward current is applied to the coil, and
    wherein the second stroke length of the bobbin is greater than the first stroke length of the bobbin.

7. The VCM of claim 6, wherein, in the optical axis direction, a first gap between the bobbin and the base is shorter than a second gap between the bobbin and the upper plate of the case at the initial position.

8. The VCM of claim 6, wherein the base is in a position facing a ground at an UP posture of the bobbin, the base is in a position perpendicular to the ground at a SIDE posture of the bobbin, and the case is in a position facing the ground at a DOWN posture of the bobbin, and
    wherein the bobbin is spaced apart from the base at the DOWN posture in the initial position.

9. The VCM of claim 8, wherein the bobbin moves in the second direction after moving in the first direction to perform a focus function at the DOWN posture.

10. The VCM of claim 1, wherein the recess of the housing is inwardly opened.

11. The VCM of claim 1, wherein the housing comprises a protrusion protruding from the upper surface of the housing,
    wherein the outer elastic unit of the upper elastic member comprises a hole, and
    wherein the protrusion of the housing passes through the hole of the outer elastic unit of the upper elastic member.

12. The VCM of claim 4, wherein the floor surface of the recess comprises a slanted surface slantedly formed relative to the upper surface of the housing.

13. The VCM of claim 1, wherein the recess of the housing is formed at a corner area of the housing.

14. A camera module, the camera module comprising:
    a PCB (Printed Circuit Board);
    an image sensor disposed on the PCB;
    the voice coil motor of claim 1; and
    a lens coupled with the bobbin of the voice coil motor.

15. A mobile phone, the mobile phone comprising the camera module of claim 14.

16. A VCM (Voice Coil Motor) comprising:
a base;
a case disposed on the base and comprising an upper plate and a lateral plate;
a bobbin disposed in the case;
a housing disposed between the bobbin and the case;
a coil and a magnet disposed in the case and configured to move the bobbin; and
an upper elastic member connecting the bobbin and the housing,
wherein the bobbin is configured to move for an auto focus function and a handshake compensation function,
wherein the upper elastic member comprises an inner elastic unit coupled to the bobbin, an outer elastic unit coupled to an upper surface of the housing, and an elastic connection unit connecting the inner elastic unit and the outer elastic unit,
wherein the housing comprises a recess formed on the upper surface of the housing, and
wherein the recess of the housing forms a space for the inner elastic unit to move to a position lower than the outer elastic unit.

17. The VCM of claim 16, wherein the bobbin is spaced apart from the base at an initial position when no current is applied to the coil, and
wherein the bobbin is configured to move from the initial position in a first direction approaching the base within a first stroke length when a backward current is applied to the coil.

18. The VCM of claim 17, wherein the recess of the housing comprises a floor surface facing the elastic connection unit, and
wherein, in an optical axis direction, a distance between the upper surface of the housing and the floor surface of the recess is greater than the first stroke length of the bobbin.

19. The VCM of claim 17, wherein the bobbin is spaced apart from the case at an initial position when no current is applied to the coil,
wherein the bobbin is configured to move from the initial position in a second direction approaching the upper plate of the case within a second stroke length when a forward current is applied to the coil, and
wherein the second stroke length of the bobbin is greater than the first stroke length of the bobbin.

20. A VCM (Voice Coil Motor) comprising:
a base;
a case disposed on the base and comprising an upper plate and a lateral plate;
a bobbin disposed in the case;
a housing disposed between the bobbin and the case;
a coil and a magnet disposed in the case and configured to move the bobbin; and
an upper elastic member connecting the bobbin and the housing,
wherein the upper elastic member comprises an inner elastic unit coupled to the bobbin, an outer elastic unit coupled to an upper surface of the housing, and an elastic connection unit connecting the inner elastic unit and the outer elastic unit,
wherein the housing comprises a recess concavely formed on the upper surface of the housing,
wherein the recess of the housing is overlapped with the elastic connection unit of the upper elastic member, and
wherein the recess of the housing comprises a stepped portion.

* * * * *